US007814516B2

(12) United States Patent
Stecyk et al.

(10) Patent No.: US 7,814,516 B2
(45) Date of Patent: *Oct. 12, 2010

(54) CONTROL SYSTEM AND USER INTERFACE FOR NETWORK OF INPUT DEVICES

(75) Inventors: Polly Stecyk, Fountain Valley, CA (US); Brian Peterson, Cypress, CA (US); Brian D Maxson, Riverside, CA (US); Pavel Houda, Laguna Hills, CA (US); George E. Palmer, Huntington Beach, CA (US); Shenta T. Pu, Irvine, CA (US); Martin Zanfino, Coto de Caza, CA (US); Robert A. Perry, Mission Viejo, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 1283 days.

This patent is subject to a terminal disclaimer.

(21) Appl. No.: 10/138,702

(22) Filed: May 2, 2002

(65) Prior Publication Data

US 2002/0171624 A1 Nov. 21, 2002

Related U.S. Application Data

(60) Provisional application No. 60/288,317, filed on May 3, 2001.

(51) Int. Cl.
*H04N 7/18* (2006.01)
(52) U.S. Cl. .............. 725/80; 725/59; 725/78; 725/81; 725/82; 725/85; 725/38; 725/39; 725/47; 725/48; 725/52; 348/734; 348/706; 348/552; 348/553; 348/554; 348/705; 348/460; 348/731; 715/714; 715/716; 715/717; 715/718; 700/17; 340/825.22; 340/825.24; 340/825.25; 340/825.69

(58) Field of Classification Search .......... 725/37; 348/552
See application file for complete search history.

(56) References Cited

U.S. PATENT DOCUMENTS 5,416,535 A 5/1995 Sato et al.

(Continued)

FOREIGN PATENT DOCUMENTS

JP 10-145420 5/1998

(Continued)

*Primary Examiner*—John W Miller
*Assistant Examiner*—Chenea P Smith
(74) *Attorney, Agent, or Firm*—Orrick, Herrington & Sutcliffe LLP

(57) ABSTRACT

Apparatus, methods, and systems for centrally and uniformly controlling the operation of a variety of devices;, such as communication, consumer electronic, audio-video, analog, digital, 1394, and the like, over a variety of protocols within a network system and, more particularly, a control system and uniform user interface for centrally controlling these devices in a manner that appears seamless and transparent to the user. In a preferred embodiment, a command center or hub of a network system includes a context and connection permutation sensitive control system that enables centralized and seamless integrated control of all types of input devices. The control system preferably includes a versatile icon based graphical user interface that provides a uniform, on-screen centralized control system for the network system. The user interface, which includes a visual recognition system, enables the user to transparently control multiple input devices over a variety of protocols while operating on a single control layer of an input command device. In an alternative embodiment, the control system also enables gated signal pass-through control while avoiding signal jamming.

104 Claims, 19 Drawing Sheets

U.S. PATENT DOCUMENTS

| | | | |
|---|---|---|---|
| 5,455,636 A | 10/1995 | Furrey et al. | |
| 5,596,372 A | 1/1997 | Berman et al. | |
| 5,602,664 A | 2/1997 | Doyle | |
| 5,883,677 A | 3/1999 | Hofmann | |
| 5,990,883 A | 11/1999 | Byrne et al. | |
| 5,995,155 A | 11/1999 | Schindler et al. | |
| 6,003,041 A | 12/1999 | Wugofski | |
| 6,032,202 A | 2/2000 | Lea et al. | |
| 6,038,614 A | 3/2000 | Chan et al. | |
| 6,131,130 A | 10/2000 | Van Ryzin et al. | |
| 6,169,879 B1 * | 1/2001 | Perlman | 725/119 |
| 6,182,094 B1 * | 1/2001 | Humpleman et al. | 715/513 |
| 6,182,287 B1 | 1/2001 | Schneidewend et al. | |
| 6,219,839 B1 | 4/2001 | Sampsell | |
| 6,239,794 B1 | 5/2001 | Yuen et al. | |
| 6,288,716 B1 | 9/2001 | Humpleman et al. | |
| 6,359,580 B1 | 3/2002 | Morrison | |
| 6,359,636 B1 | 3/2002 | Schindler et al. | |
| 6,449,767 B1 | 9/2002 | Krapf et al. | |
| 6,469,633 B1 | 10/2002 | Wachter | |
| 6,530,085 B1 * | 3/2003 | Perlman | 725/82 |
| 6,546,419 B1 | 4/2003 | Humpleman et al. | |
| 6,556,219 B1 | 4/2003 | Wugofski | |
| 6,567,106 B1 | 5/2003 | Wugofski | |
| 6,584,099 B1 * | 6/2003 | Sato et al. | 370/362 |
| 6,801,957 B1 | 10/2004 | Sadanaka et al. | |
| 2002/0040475 A1 * | 4/2002 | Yap et al. | 725/39 |
| 2002/0171763 A1 * | 11/2002 | Stecyk et al. | 348/552 |

FOREIGN PATENT DOCUMENTS

| | | |
|---|---|---|
| JP | 10-155188 | 6/1998 |
| JP | 2001-119407 | 4/2001 |
| JP | 2001-119769 | 4/2001 |
| JP | 2002-588308 | 5/2008 |

* cited by examiner

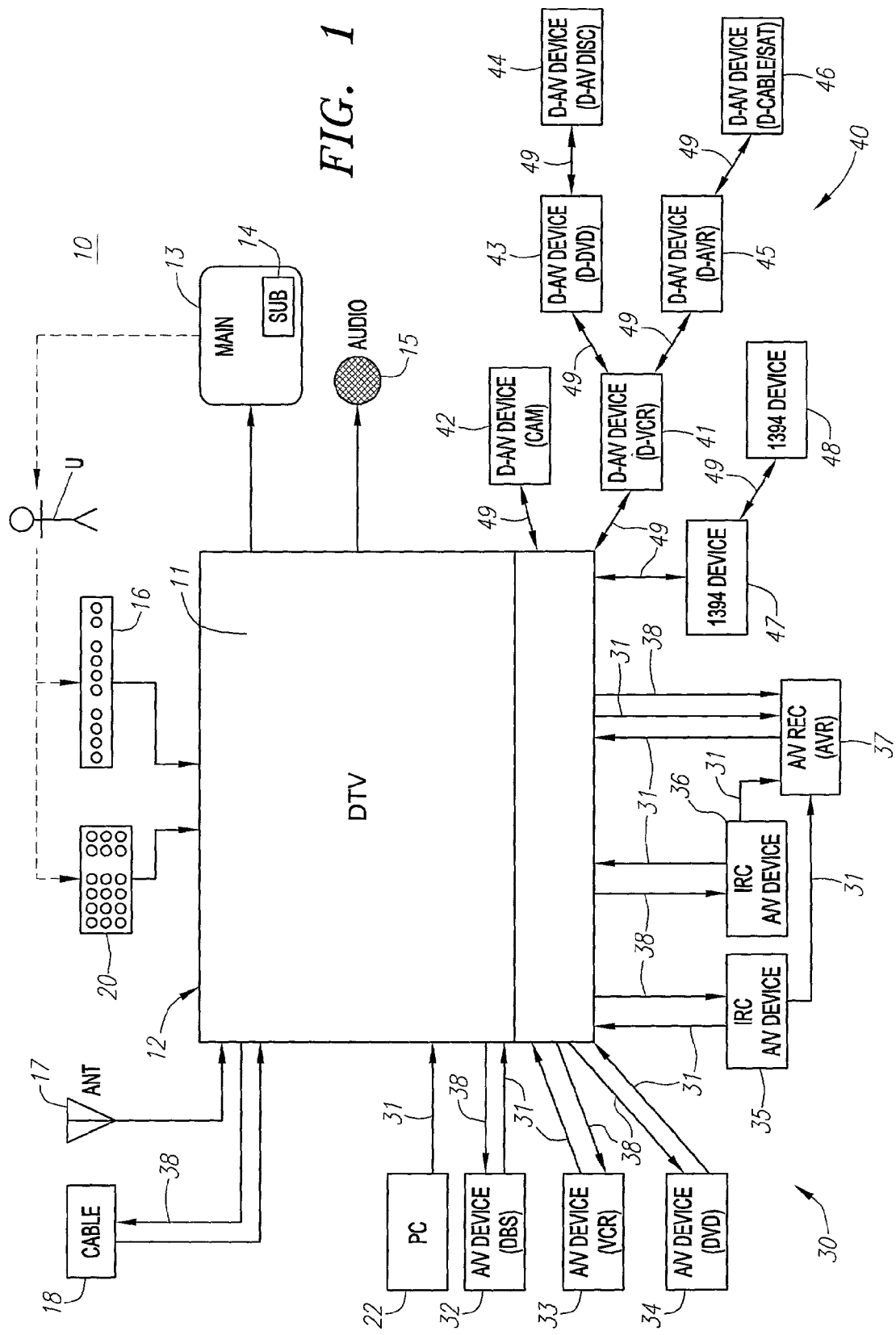

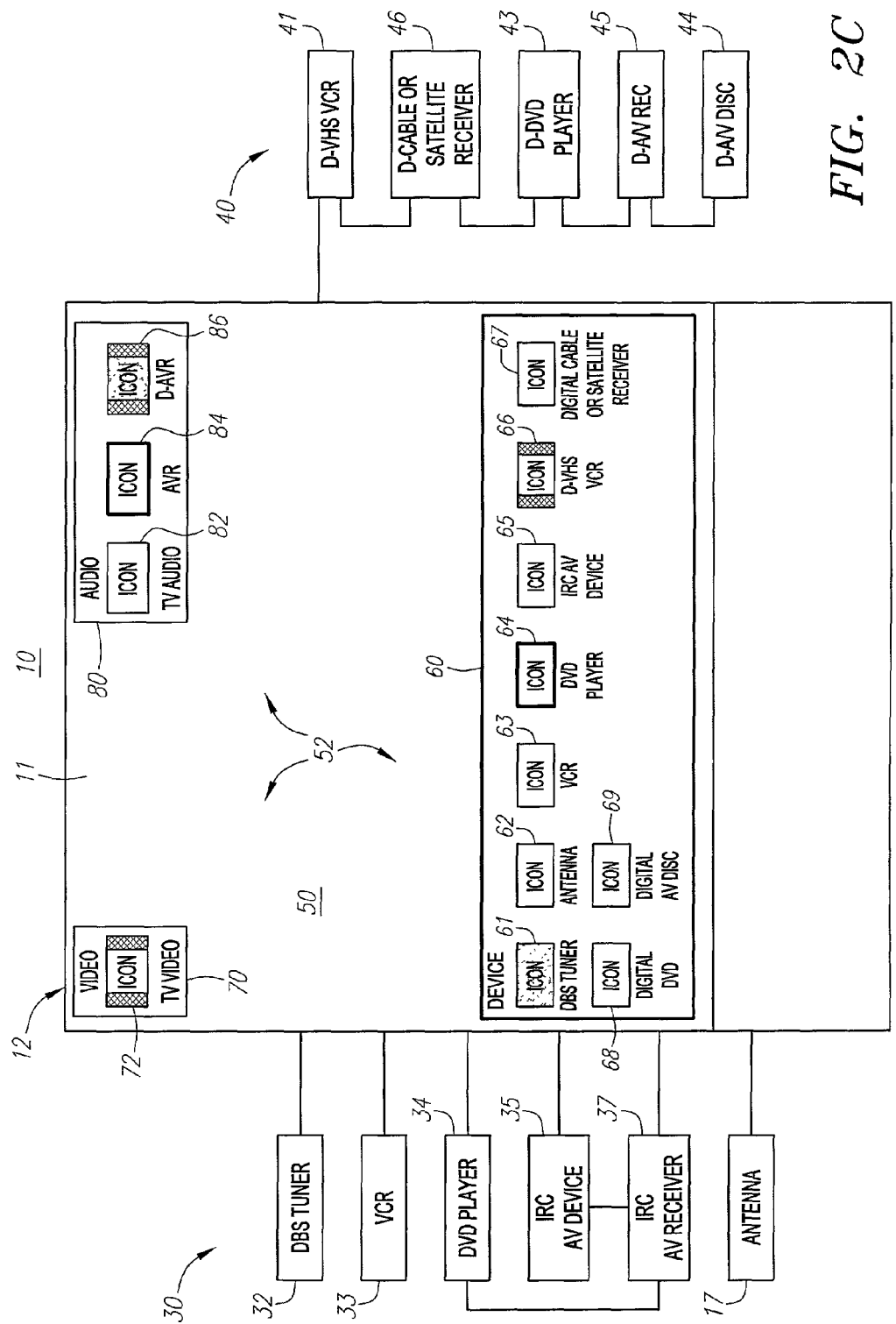

REVIEW

PLEASE REVIEW ALL THE DEVICES TO ENSURE PROPER CONNECTIONS. INPUTS WITHOUT DEVICES HAVE BEEN TURNED OFF. TO TURN AN INPUT ON, PRESS ENTER. TO MAKE CHANGES, SELECT BACK. SELECT NEXT TO FINISH.

| | NAME | TV INPUT | AVR INPUT | | 1394 NAME | |
|---|---|---|---|---|---|---|
| X | ANT A | ANT A | TV | X | DVCR | < BACK |
| | CABLE | ANT-B | TV | X | AV DISK | |
| X | ANT-DTV | ANT-DTV | TV | | | NEXT > |
| | VCR1 | INPUT-1 | VCR1 | | | |
| X | DBS | INPUT-2 | AUX | | | CANCEL |
| X | VCR2 | INPUT-3 | VCR2 | | | |
| | INPUT-4 | INPUT-4 | | | | |
| X | CAMCORD | INPUT-5 | | | | |
| | DVD | COMP-1 | DVD | | | |
| | COMP-2 | COMP-2 | | | | |
| | INP-DTV | INP-DTV | | | | |
| X | PC | VGA | | | | |

*FIG. 8*

CONTROL SYSTEM AND USER INTERFACE FOR NETWORK OF INPUT DEVICES

CROSS-REFERENCE OF RELATED APPLICATIONS

This application is related to U.S. provisional application No. 60/288,317, filed May 3, 2001, which is incorporated by reference herein.

FIELD OF THE INVENTION

The invention relates to the field of consumer electronics systems and, more particularly, to apparatus, methods, and systems for centrally controlling the operation of devices within a network of consumer electronics systems.

BACKGROUND OF THE INVENTION

The United States and other countries are quickly transitioning to digital television (DTV) to take advantage of high definition TV broadcasts. The US, in particular, is slowly moving away from and will ultimately abandon the analog television system. According to current timelines, the US government is calling for the termination of analog TV broadcasts by the year 2006. The use of an analog TV will require the addition of set-top-box down-converters to change the digital broadcasts to the lower-performance analog format such TVs were designed to receive.

Accompanying the transition to DTV is the integration of the IEEE 1394 digital home-networking technology. IEEE 1394 enables DTV and other digital devices of consumer electronics systems that incorporate IEEE 1394 to connect and communicate via single cables (FireWire®) that carry digital video, digital audio, and system control data A home network system comprising such integrated devices eliminates the myriad of cables and connectors and separate remotes currently necessary to interconnect and control electronic devices for a home theater system. With IEEE1394 technology, the DTV or some other primary video display unit (PDCU) can be engineered to be the command center of a digital home network system.

However, IEEE 1394 by itself provides no way to control conventionally wired, IR signal controlled, analog audio-video (AV) devices (IRC devices), such as analog VCRs, DVD players, cable and satellite boxes, and AV receivers, and does nothing to eliminate the myriad of cables, connectors and remotes necessary to connect and control a mixed analog and digital home theater network system. The interconnection and control of such systems can be quite complex and unwieldy. For example, simply switching from a cable broadcast to playing a movie on a DVD player may involve numerous device specific remote controls and several iterations through the different layers of control on such remotes. Such a task may require the user to switch between video inputs on the TV, switch between layers on a TV remote control to power on and play the DVD player, and then, if the user has an AV receiver (AVR), switch between layers on the TV remote and shut down the audio output from the TV and switch to an AVR remote control to power up and output audio through the AVR or, if the AVR is the current audio output device, use the AVR remote control to switch between AVR inputs to output the DVD player's audio from the AVR. Completing such tasks is often fraught with frustration especially when the user is not immediately successful in being able to watch and listen to a movie being played on the DVD player.

Thus, it is desirous to be able to centrally and seamlessly control a variety of electronic devices over a variety of protocols from a single input device and provide an easy to use user interface (UI) wherein the complexities of the control of such devices is transparent to the user.

SUMMARY OF THE INVENTION

Accordingly, the present inventions comprise novel apparatus, methods, and systems for centrally and uniformly controlling the operation of a variety of devices over a variety of protocols within a network system and, more particularly, a control system and uniform user interface for centrally controlling these devices in a manner that appears seamless and transparent to the user. For example, in an entertainment system or a home theater network system (HTNS) comprising a mix of analog IR controlled (IRC) and digital 1394 audio-video (AV) devices, control and operation of the IRC and 1394 versions of an AV device appears the same to the user.

In a preferred embodiment, a HTNS in accordance with the present invention comprises a primary display and control unit (PDCU) and a mix of IRC and 1394 AV devices and other inputs. The PDCU may comprise an AV system such as a television and, preferably, a digital television (DTV), having appropriate circuitry and programmable logic for operation of a control system in accordance with the present invention. Alternatively, the PDCU may comprise a primary display unit such as a TV or a "dumb" monitor or display, and a dedicated controller or computer housed in a separate chassis from the primary display unit and comprising appropriate programmable logic for operation of a control system in accordance with the present invention. Preferably, the PDCU includes several I/O ports to which external or peripheral devices, such as the IRC and 1394 AV devices, may be coupled.

Numerous possible configurations of a HTNS in accordance with the present invention are possible. For example, the HTNS may comprise numerous IRC and 1394 devices and other system inputs interconnected in a variety of ways to one another and to the PDCU. Preferably, the PDCU integrates IEEE 1394 and EIA-775 technology as well as the Home Audio Video Interoperability (HAVi) networking software technology and AV/C, which compliment the IEEE 1394 technology. The 1394 devices are preferably connected in series and/or in parallel to the PDCU across 1394 cable, while the IRC devices are connected to the PDCU in parallel across conventional AV cables and controlled across IR blaster cables. The IR blaster cables enable messages or commands comprising device specific IR codes to be communicated to the IRC devices.

In one innovative aspect of the present invention, the PDCU includes a context sensitive control system that enables centralized and seamless integrated control of both 1394 and IRC-type devices, as well as internal TV-type inputs and other input devices and system hardware interconnected to the PDCU. As such, the PDCU is the command center or hub of the HTNS or other network systems that may comprise, in addition to entertainment AV type devices, home appliances and home lighting, heating, air conditioning, security-type systems, and the like. The control system preferably includes a control module that is capable of interpreting an input command such as an event signal from a system remote, determining what action needs to take place, for example, navigate through menus on the screen of the PDCU or operate an attached AV device, determining what devices to connect and how to connect them, and then preparing and sending device appropriate messages or commands to the input devices. Preferably, for supported IRC devices, the control module includes a library of IR codes and is capable of translating a input command, such as a digital input command, into a message comprising IR codes from the IR code library appropriate for the device, and then blasting the command message to the IRC device to drive the IRC device. The control system of the present invention may also be capable of learning and/or uploading IR code of a variety of IRC devices. All such operations, however, are advantageously transparent to the consumer or user.

In another innovative aspect of the present invention, the control system includes a versatile icon based graphical user interface (UI) to provide a uniform, on-screen centralized control system for the network system. The UI enables the user to transparently control multiple input devices such as internal TV-type devices, AV devices, and other input devices over different protocols while operating on a single layer of a system remote control, e.g., the TV layer of a universal TV remote. For example, operation of an IRC DVD player and a 1394 DVD player appears identical to the user. The UI also advantageously provides on-screen, real time visual recognition of the state of the system, device availability, operation or connection options, active connections, navigation, and the like.

In operation, the user selects the "device" button on the remote, which causes the control system to display a device selection menu on the screen of the PDCU. The device selection menu preferably comprises a device window, a video window, an audio window, and, when a recording or other peer-to-peer connection is active, a connection window. The user next navigates through the device selection window and highlights a device icon, such as a VCR icon, to play a movie on the VCR. The user may move or jump to an audio selection window and highlight an AV receiver (AVR) icon for audio output from an AVR. Selection of the VCR and AVR from the device selection menu by pressing the "enter" or some other appropriate key on the system remote control while the corresponding icons are highlighted (selected), causes the control system to perform all necessary switching, make all necessary connections and display a transport menu on the screen of the PDCU. The transport menu is a device control menu preferably comprising device appropriate control function buttons such as "play", "FF", "RW", and the like. Alternatively, device specific control menus, i.e., device supplied, may be displayable and operable through the control system of the present invention. Lastly, the user selects the play button in the transport menu by pressing the "enter" or "play" buttons on the system remote control to play the movie. The steps taken by a user would be the same whether the device is an IRC or a 1394 device. As noted above, the control system interprets and acts on the user's selections, performing all necessary switching and making all necessary connections, in a manner that is transparent to the user.

A further innovative aspect of the present invention includes the connection permutation sensitivity of the control system. In particular, once a device such as the VCR is selected, the control system will automatically control it and the rest of HTNS based on stored device and device connection configuration data. For instance, if the VCR is connected to both an AVR and the PDCU, wherein the audio from VCR is to be outputted by the AVR while the video is outputted by the PDCU, upon selection of the VCR and AVR, the control system will automatically turn off the audio output from the PDCU and turn on the AVR to output the audio from the VCR when the VCR or switch inputs within the AVR if it is the current audio output or sink device. Thus, the control system handles all of the necessary switching transparently to the user. This situation dependent, context sensitive method tends to be superior to the "macro" command capability of some remotes because the control sequences of the control system are not dependent on the network devices being in a particular state at the beginning of the sequence. Further, this aspect of the control system enables seamless peer-to-peer communication and operation such as recording between devices even when the PDCU is not physically involved in the connection.

In yet another innovative aspect of the present invention, the control system includes a configuration setup subsystem. It provides users with the capability to setup the configuration or device interconnections of the network system in a first time out of the box initial setup mode or the capability to change/modify/delete existing configurations in an edit mode. In the initial setup mode, the user is provided with a pre-set configuration of IRC device input connections on the PDCU and instructed to connect the IRC devices to the PDCU accordingly. The user then logs in each IRC device within the network system and the control system builds a device list and device connection database. If the network system includes IRC devices interconnected to the PDCU through other input connections, the user may enter the edit mode of the subsystem to customize the input connections of such devices as well as delete individual device or entire system configuration data. The navigation through the configuration setup subsystem is text and screen driven. In an alternative, navigation through the configuration setup subsystem may be by voice recognition or the configuration setup subsystem may be graphically driven.

In yet another innovative aspect, the control system preferably enables IR signal pass-through control of non-supported IRC devices within the network system, while avoiding IR signal jamming. Avoidance of IR signal jamming may be accomplished by appropriate signal transmission gapping control or through a gated control system. Preferably, the gated pass-through control system includes a gate mechanism that controls the pass-through of IR signals to the non-supported IRC devices. An IRC device controller, which is adapted to translate remote commands into messages containing device appropriate IR code for supported IRC devices, controls the operation of the gate. As such, the IRC controller preferably maintains the gate in a closed state as the IRC controller transmits device specific IR code messages to supported devices. When such transmissions are complete, the IRC controller may transition the gate to an open state to allow IR signals to freely pass to non-supported devices.

Other aspects and features of the present invention will become apparent from consideration of the following description taken in conjunction with the accompanying drawings.

BRIEF DESCRIPTION OF THE DRAWINGS

FIG. 1 is a diagram showing an example of a device interconnect configuration for a home theater network system of the present invention.

FIG. 2C is a schematic showing the home theater network system provided in FIG. 2A. The graphical user interface of the control system shown on the display of the television provides visual recognition of current system state, user navigation through device and audio menus, device connection options, and active device connections.

FIG. 8 is a diagram showing a device connection review menu for the setup configuration subsystem.

DETAILED DESCRIPTION OF THE INVENTION

Figure 2A:
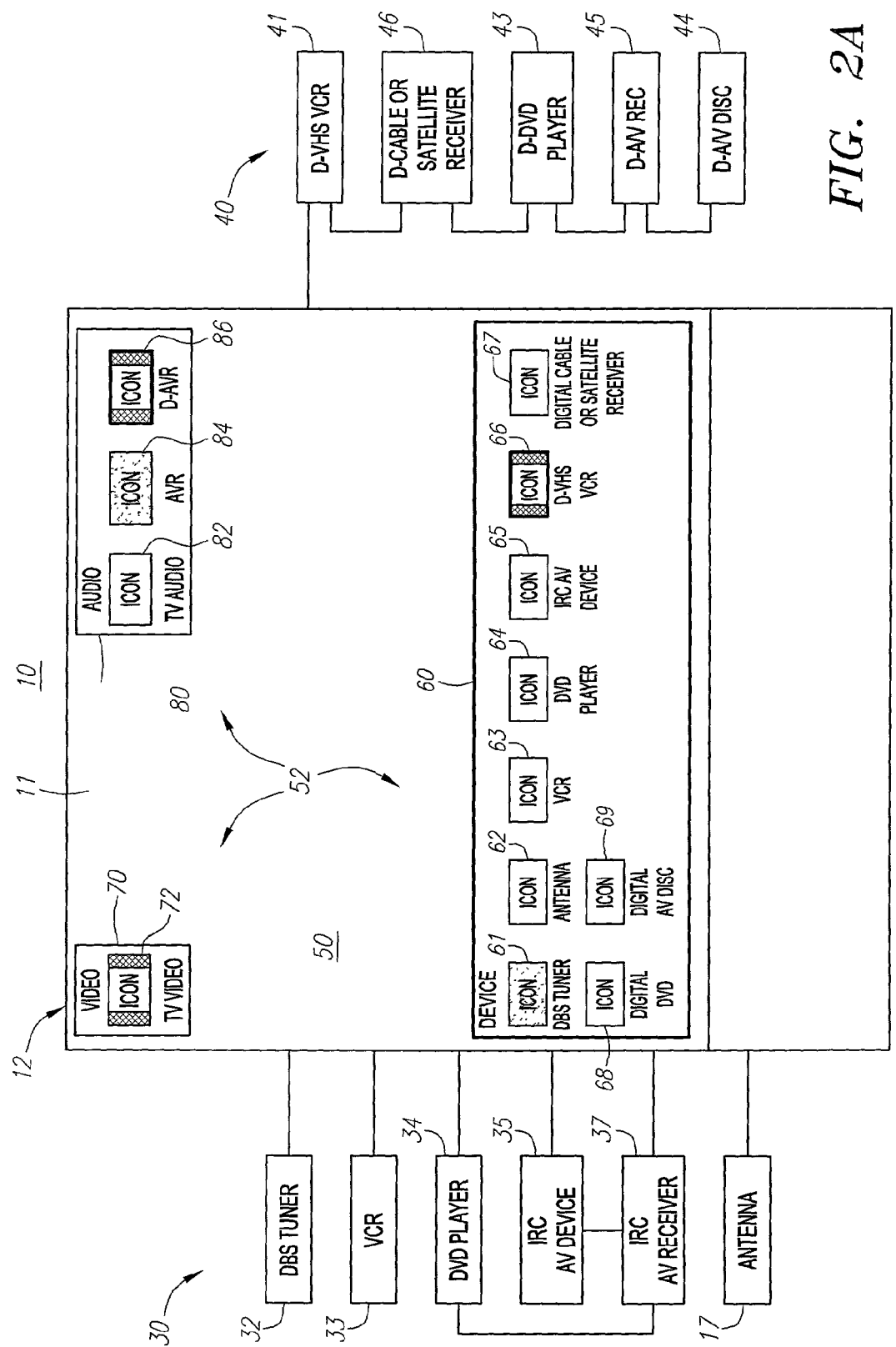
FIG. 2A is a schematic showing an example of a home theater network system of the present invention comprising a television having a variety of IRC and 1394 AV devices connected to the television. A graphical user interface of the control system of the present invention is shown on the display of the television providing visual recognition of the current system state, user navigation through device and audio menus, device connection options, and active device connections.

Referring in detail to the figures, novel apparatus, methods, and systems for centrally and uniformly controlling the operation of a variety of devices over a variety of protocols within a network system are described. In particular, a control system and user interface that provide uniform, seamless and transparent centralized control of a network of devices over a variety protocols are described. It will be understood by those skilled in the art that numerous configurations of a network system in accordance with the present invention are possible. For example, a network system may comprise a mix of communication devices, consumer electronic systems, audio/video (A/V) devices, high and low speed devices, analog and digital devices, globally and locally controlled devices, and AV and non-AV devices, and the like, and may comprise both analog IR controlled and digital 1394 AV and other input-type devices. For exemplary purposes only, the apparatus, systems and methods in accordance with the present inventions will be described primarily in the context of a Home Theater Network System (HTNS).

In a preferred embodiment, a HTNS in accordance with the present invention comprises a primary display and control unit (PDCU), which functions as the hub or command center of the HTNS, and a mix of IR controlled (analog) and 1394 (digital) AV devices, and other inputs. The AV devices and other inputs may be interconnected in a variety of ways to each other and to the PDCU. The PDCU preferably includes an integrated control system with a graphical user interface (UI) for making connections between components of the HTNS and controlling their operation. The control system provides the user with centralized control of all of the supported devices in the HTNS and, in an alternative embodiment, enables pass-through control of non-supported devices while avoiding signal jamming.

Preferably, the PDCU comprises an AV system such as a television and, more preferably, a digital television (DTV), comprising appropriate circuitry and programmable logic for operation of a control system in accordance with the present invention. Alternatively, the PDCU may comprise a primary display unit such as a TV or a "dumb" monitor or display, and a dedicated controller or a computer housed in a separate chassis from the primary display unit and comprising appropriate programmable logic for operation of a control system in accordance with the present invention. For exemplary purposes only, however, the description that follows primarily describes the present inventions with regard to a DTV.

Preferably, the control system of the present invention integrates IEEE 1394 and EIA-775 technology as well as the Home Audio Video Interoperability (HAVi) networking software technology and AV/C, which compliment IEEE 1394 technology. The control system also preferably incorporates a bi-directional 1394 bus interface, which is compliant with IEEE 1394-1995 and IEC 61883-1, exchanges MPEG-2 video with other devices in accordance with IEC 61883-4, at HD and SD resolutions as described in IEC61883-2, 3, 4, and exchanges digital audio as described in IEC 61883-6, which specifications are all incorporated herein by reference. The control system also preferably functions as a 1394 bus cycle master, as defined in IEEE 1394-1995 8.3.1.4, a bus manager, as defined in IEEE 1394-1995 8.3.1.6, and an isochronous resource manager, as defined in IEEE 1394-1995 8.3.1.5, provides higher-level 1394 interfaces to open cable and other AV/C devices as defined in EIA-775A, and conforms to Profile B of 775A subscriber devices, which specifications are all incorporated herein by reference. Although capable of being configured to do so, the control system will preferably not respond to any type of 1394 commands from other 1394 devices, in any protocol, and preferably does not conform to the HAVi Display Functional Module. The control system's Config ROM and SDD preferably identifies itself to other bus members that it does not support those sub-unit standards. In addition, the PDCU is preferably a full AN device (FAV) as described in the HAVi 1.0 Specification, which specification is incorporated herein by reference.

Turning to FIG. 1, an exemplary embodiment of a HTNS 10 in accordance with the present invention is shown comprising one of numerous possible device connection configurations. As the hub of the HTNS 10, the DTV 12 of the present of invention comprises a control system, with capabilities as discussed above and in greater detail below, that provides seamless integrated control of the entire supported HTNS 10. Like conventional TVs, the DTV 12 includes a screen 11 with main 13 and sub 14 (e.g., PIP, POP, etc.) video outputs, audio output 15 and a control panel 16 and numerous I/O ports to which input devices may be connected, and is preferably adapted to be controlled remotely by IR signals transmitted from a remote control device 20. Alternatively, the DTV 12 may be adapted to be controlled remotely by wireless RF transmissions, by voice commands via a voice recognition system, through a dial up modem connection, through an internet connection, through a USB connection using a keyboard or mouse, and the like.

In accordance with the present invention, the HTNS 10, as depicted, includes a plurality of IR controlled (IRC) devices 30, 1394 devices 40, including AV and others 1394 devices, and other inputs such as a PC 22, antennas 17 and the like, interconnected to the DTV 12 and one another. The 1394 devices 40 are preferably connected in series and/or in parallel to the DTV 12 across 1394 cable 49, while the IRC devices 30 are connected to the DTV 12 in parallel across conventional AV cables 31 and controlled in parallel across IR transmission (blaster) cables 38. The IR blaster cables 38 enable messages or commands comprising device specific IR codes to be communicated to the IRC devices 30. The DTV 12 preferably includes a library of device specific IR codes for supported devices and a control system that is capable of translating an input command (digital or analog) from the remote control 20 into a device appropriate message comprising device specific IR codes, which is then communicated to the IRC device 30 to control and operate or drive the IRC device 30.

As depicted, the IRC input devices 30 may include such devices as a cable box 18, a digital broadcast satellite tuner (DBS) 32, a video cassette recorder (VCR) 33, a digital video disk player (DVD) 34 and the like, connected to the DTV 12 across AV cable 31 such that the audio and video outputs, or, optionally, just video output, from these devices may be inputted to the DTV 12. The IRC input devices may also include such devices as a IRC AV receiver (AVR) 37 with audio output from the DTV 12 being directed to the AVR 37 across an AV cable 31. Although capable of outputting video to the DTV 12, the AVR 37 is preferably not configured to output video to the DTV 12. With an AVR 37 included in the HTNS 10, the DBS 32, VCR 33 and DVD 34, or other IRC AV devices 35 and 36, such as a second VCR, a DVD and the like, may be connected to the AVR 37 and the DTV 12 such that their video outputs are directed to the DTV 12 and their audio outputs are directed to the AVR 37. In the alternative, although not preferred, these devices may just be connected to the AVR 37 with both their audio and video outputs directed to the AVR 37.

As indicated above, the IRC devices 30 are controlled and operated across IR blaster cables 38. The IR blaster cables 38 of the present invention preferably comprise an electrical cable with an IR emitter connected to one end and a mini-plug for connection to the DTV 12 on the other end of the cable. The IR emitter, which is preferably L-shaped, is preferably placed in front of or glued onto the IR detector of each IRC device 30 to communicate device specific IR code based messages to the IRC device 30. The IR emitter may include an opaque backing, which may block IR transmissions from other sources such as the remote. The blaster cable may, in the alternative, include a second mini-plug instead of an IR emitter for IRC devices 30 that have IR ports instead of or in addition to an IR detector.

As depicted, the 1394 devices 40 may include such devices as a digital VCR (D-VCR) 41, a digital camcorder 42, a digital DVD (D-DVD) 43, a digital AV (D-AV) disc player 44, a digital AVR (D-AVR) 45, a digital (D-) cable or satellite receiver 46, and the like, or other 1394 compatible systems or devices 47 and 48 such as home appliances and home lighting, heating, air conditioning and security-type systems, and the like. The 1394 devices 40 may include HAVi-type 1394 devices and may be interconnected to the DTV 12 and one another in series or parallel across 1394 cable 49.

As shown in FIGS. 2A-2F, the DTV 12 of the HTNS 10 includes a control system comprising an on-screen, graphical user interface (UI) 50. The UI 50 and control system preferably include a device selection menu 52 preferably comprising graphically representative, on-screen displayable icons corresponding to the supported devices of the HTNS 10, audio and video input options, device output destinations, active "in-use" device connections, and the like. The icons are preferably labeled with user U preferred names corresponding to the device. Operation and control of the supported HTNS 10 through the UI 50 is seamless such that the control of a IRC VCR 33 and a 1394 VCR 41 appears identical to the user U.

The device selection menu 52 of the present invention preferably includes a device selection window (device window) 60, a video window 70, an audio selection window (audio window) 80, and, if a recording or other peer-to-peer connection is active, a connection window 90, which are preferably labeled "DEVICE", "VIDEO", "AUDIO" and "CONNECTION", respectively. As depicted, the device window 60 is preferably located toward the bottom of the screen 11, while the video 70, audio 80, and connection 90 windows are preferably located toward the top of the screen with the video and connection windows 70 and 90 located toward the upper left corner and the audio window 80 toward the upper right corner. One of skill in the art would recognize that the device selection menu 52 may include any number of windows and is not limited to the device, video, audio and connection windows 60, 70, 80 and 90 discussed above or their orientation or location on the screen.

Icons corresponding to the IRC and 1394 input devices 30 and 40, such as a DBS tuner icon 61, an antenna icon 62, a VCR icon 63, a DVD icon 64, a generic IRC AV device icon 65, a D-VHS VCR icon 66, a D- cable or satellite receiver icon 67, a D-DVD icon 68, a D-AV disc icon 69, and the like are displayed in the device window 60 as AV source or input device options. An icon 72 corresponding to the TV video icon 72 is displayed in the video window 70. If other video sink or video output display devices are incorporated within the HTNS 10, icons corresponding thereto may preferably be displayed in the video window 70 or as part of a pull down menu. Icons corresponding to the audio sink or audio output devices, such as the TV audio icon 82, an IRC, AVR icon 84 and a 1394 AVR icon 86, are displayed in the audio window 80. If a recording or other peer-to-peer connection is active, icons corresponding to the destination or sink devices, such as the VCR icon 92 as shown in FIG. 2B or the D-VHS VCR and AV Disc icons as shown in FIG. 2F, are displayed in the connection window 90. The windows may be configured to display all device icons at once or, as preferred, configured to limit the display to a subset of all of the icons in an initial view with window scrolling, paging or pull-down capabilities to view the remaining icons.

Incorporated within the UI 50 is an intuitive, on-screen, head-up, real-time visual recognition system. The visual recognition system preferably visually communicates to the user U the current system state including active "in-use" connections, input device options, audio output options, video destinations and output options, peer-to-peer connections, and navigation selections as the user U operates the controls on the remote 20 or control panel 16 and displays or navigates through the device selection menu 52. The visual recognition system of the present invention may employ a variety of visual display indicators such as highlighting the exterior of the icon with light, different colors, different line types or the like, changing the icon color, fill pattern, or the like, graying or crossing out the icon, providing textual indicators, and the like, to visually indicate the system status, input and connection options, destinations, navigation, peer-to-peer connections and the like. In a preferred embodiment, the states or conditions of visual recognition include "disabled", "current device" and "current menu selected icon" (or menu location), and more preferably: (1) current menu selected icon and current source or sink device (primary and secondary highlighting); (2) current menu selected icon and not current source or sink device (primary highlighting); (3) not current menu selected icon and current source or sink device (secondary highlighting); (4) not current menu selected icon and not current source or sink device (no highlighting); (5) not available or disabled (tertiary highlighting, e.g., grayed out). The icons themselves may be configured to convey additional information such as power state, channel, transport state or action (e.g., a dynamic motion icon indicating the device is playing), and the like.

Figure 2B:
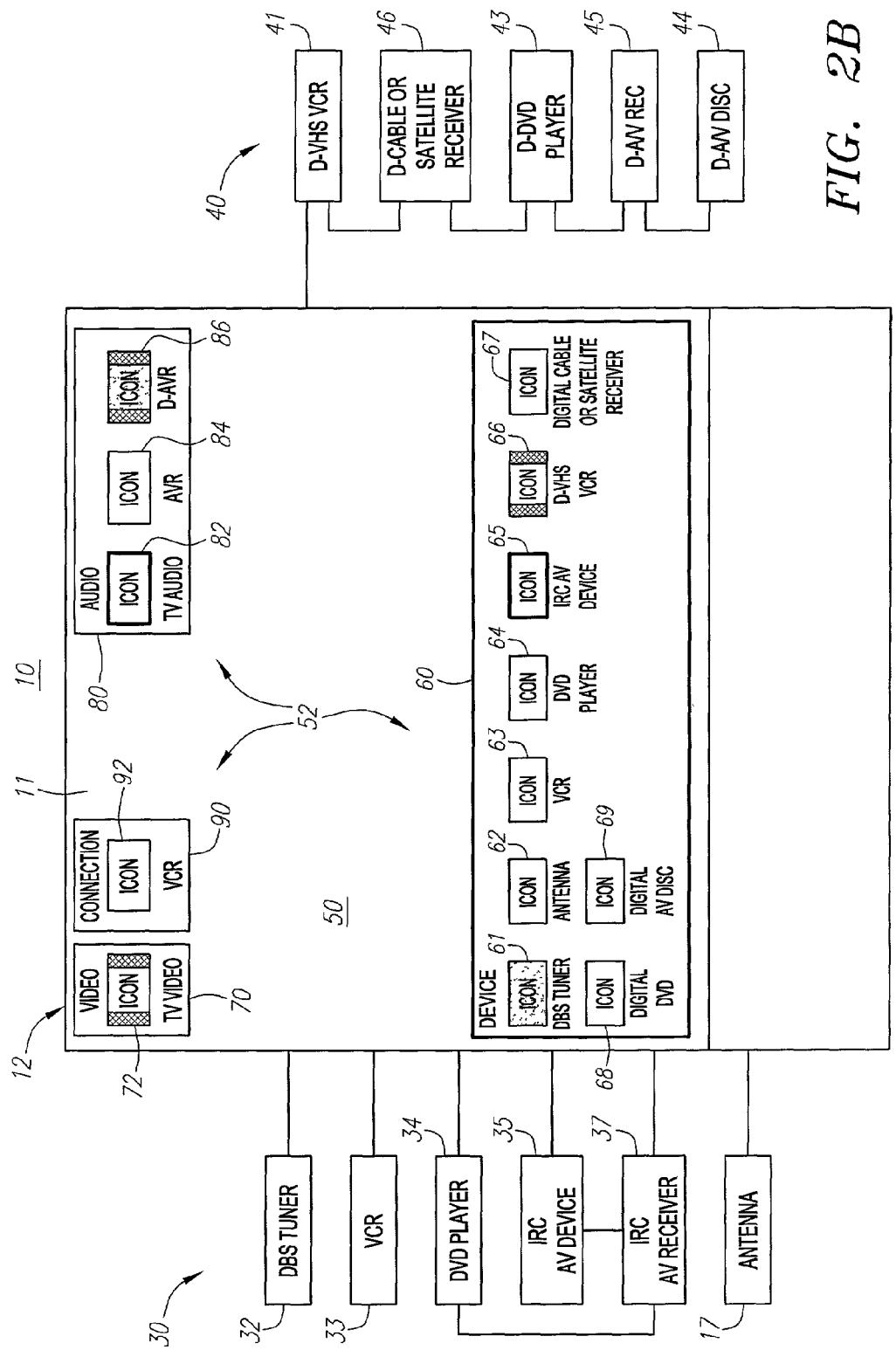
FIG. 2B is a schematic showing the home theater network system provided in FIG. 2A. The graphical user interface of the control system shown on the display of the television provides visual recognition of current system state, user navigation through device and audio menus, device connection options, and active device connections.

Referring to FIGS. 2A-2C, an example of the visual recognition subsystem is depicted. A primary highlight, shown as a bold outline about the D-VHS VCR and D-AVR icons 66 and 86 in FIG. 2A, the IRC AV device and TV audio icons 65 and 82 in FIG. 2B, and the DVD and AVR icons 64 and 84 in FIG. 2C, may be used to indicate the currently selected icon while navigating through the device and audio windows 60 and 70. If the connection window is made navigable, a bold outline about an icon in that window may be used to indicate the current menu selected connection icon for possible connection cancellation. A secondary highlight, shown as a cross-hatch within the D-VHS VCR, TV video, and D-AVR icons 66, 72 and 86, may be used to indicate the current AV source device, the current video sink device and the current audio sink device. A tertiary highlight, shown as a graying-out of the DBS tuner and AVR icons 61 and 84 in FIG. 2A and the DBS tuner and D-AVR icons 61 and 86 in FIGS. 2B-2C, may be used to indicate that a particular device is unavailable or disabled. No highlighting, however, may be used to indicate a device is connected to the HTNS 10 and available for operation and connection to other devices, but is not the current source or sink device or menu selected device icon. In addition, primary highlighting, shown as a bold outline about device window 60 in FIGS. 2A-2B and audio window 80 in FIG. 2C, may be used to indicate the window in which the user is currently navigating.

Turning to FIG. 2F, a preferred embodiment of the UI 1050 of the present invention, with its device selection menu 1052 and visual recognition subsystem, is shown displayed on a screen 1011 of a DTV or some other primary display unit, The UI 1050 preferably includes device specific graphically representative and appropriately labeled icons corresponding to the supported devices connected to the HTNS, the video sink or output device, the active connections, and the audio sink or output devices. For example, the icon 1061*a* for a DBS tuner includes a picture of a satellite dish and a name label 1061*b* of "DBS". Similarly, icons for antennas preferably include a picture of an antenna, VCR icons preferably include a picture of a cassette tape, video camera icons preferably include a picture of a camera, AV receiver icons preferably include a picture of a stereo, TV icons preferably include a picture of a TV, and the like. In addition to a device name label 1061*b*, the icon may include a device type label such as a 1394 label 1063*a* or a HAVi label 1063*b*.

As part of the device selection menu 1052, the icons are preferably displayed within a device selection window 1060 that includes a window label 1062 of "Device", a video window 1070 that includes a window label 1071 of "Video", an audio selection window 1080 that includes a window label 1081 of "Audio", and, if a recording or other peer-to-peer connection is active, a connection window 1090 that includes a window label 1091 of "Connection". The connection window 1090 may be displayable whenever there is an active recording or peer-to-peer connection, or only displayable whenever there is such a connection and the icon corresponding to the source device of the connection is the currently selected icon during navigation through the device selection window 1060; see the Ant A icon in device window 1060. A primary highlight 1065 and 1083 such as outlining an icon in a particular color, e.g., yellow, which in FIG. 2F is shown as a different shaded outline about the ANT A and AVR icons, and/or changing the color of these icons' device name labels 1067 and 1082 to a particular color, e.g., yellow, is used to indicate the currently selected device icon while navigating through device and audio windows 1060 and 1080. A secondary highlight 1064, 1084 and 1072 such as changing the color of the icon to a particular color, e.g., gold, which is shown in FIG. 2F as a change in the shading or lighting of the CABLE, AVR and TV icons, is used to indicate the current AV source device, audio sink or output device and video sink or output device. A tertiary highlight 1067 and 1068, such as graying out of an icon and its label in the device or audio windows 1060 and 1080, is used to indicate that a particular device is unavailable or disabled. The use of no highlighting, however, is used to indicate a device is connected to the HTNS and available for operation and connection to other devices. In addition, the use of primary highlighting 1068 such as outlining the device or audio window in a particular color, e.g., yellow, which is shown as a different shaded band about the device window 1060 in FIG. 2F, may be used to indicate the window in which the user is currently navigating.

Figure 2D:
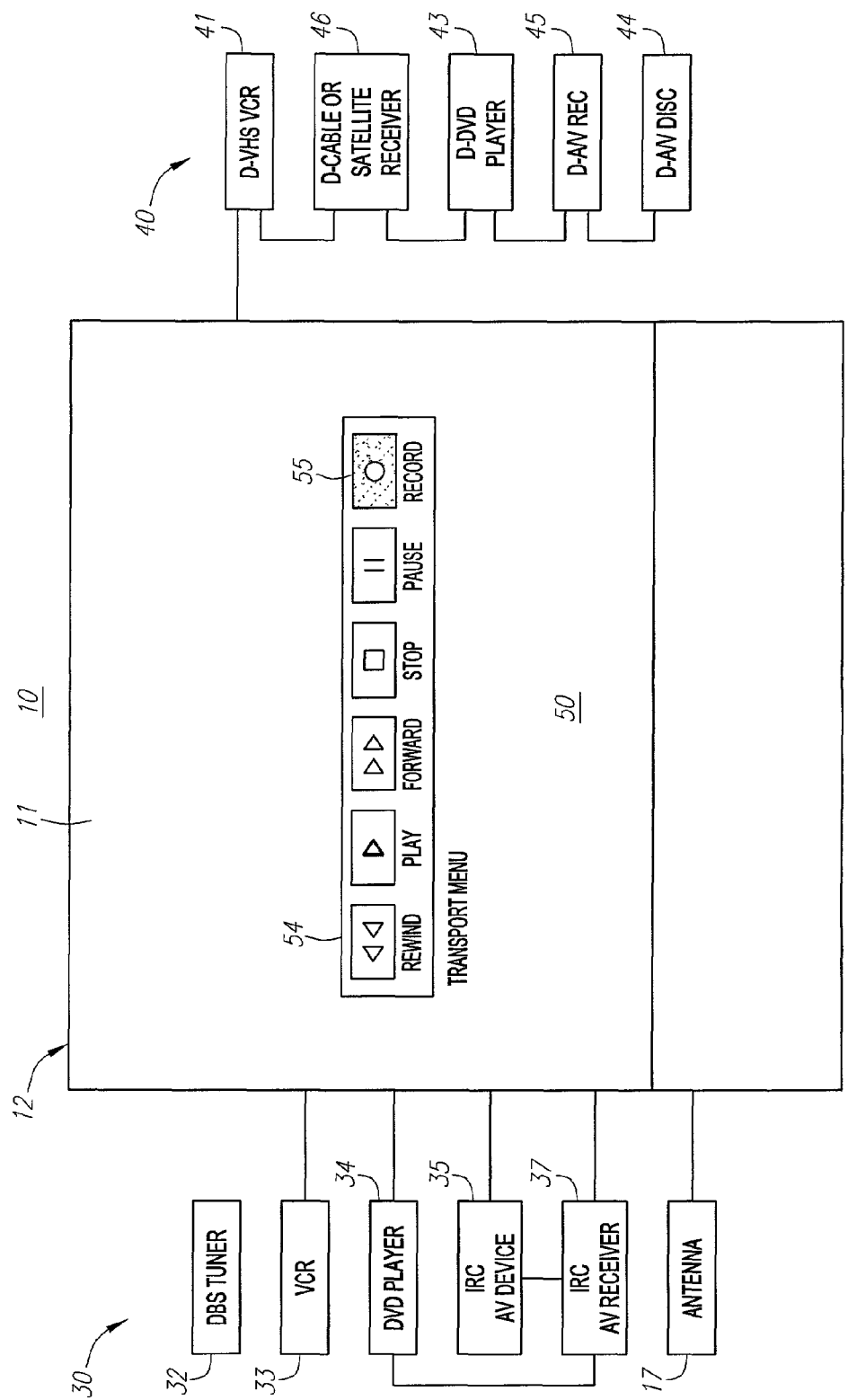
FIG. 2D is a schematic showing the home theater network system provided in FIG. 2A. The graphical user interface of the control system shown on the display of the television provides a device appropriate control (transport) menu for operation of a selected device.

FIG. 2D shows a transport menu 54 of the UI 50 displayed in the main video 13 on the screen 11 of the DTV 12. The transport menu 54 is a device control menu preferably comprising common device appropriate control function buttons such as "play", "FF", "RW", and the like. Primary highlighting, shown as a bold outline of the arrow on the "play" button, may be used to indicate the current function button selected while navigating within the transport menu 54. Tertiary highlighting, shown as the graying out of the "record" button 55, may be used to indicate that a function is not available or not supported by the currently selected device.

Figure 2E:
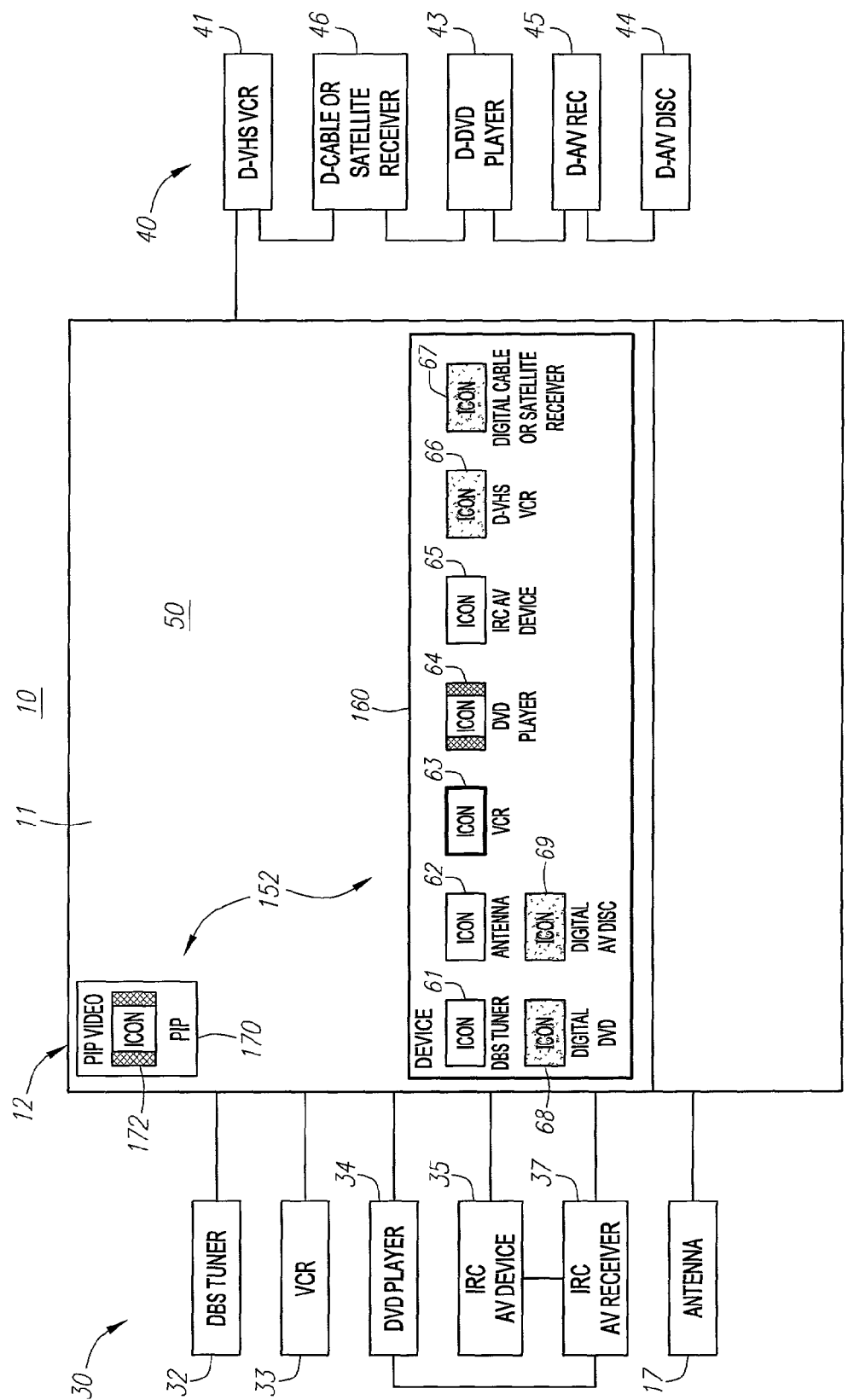
FIG. 2E is a schematic showing the home theater network system provided in FIG. 2A. The graphical user interface of the control system shown on the display of the television provides PIP device connection options.
Figure 2F:
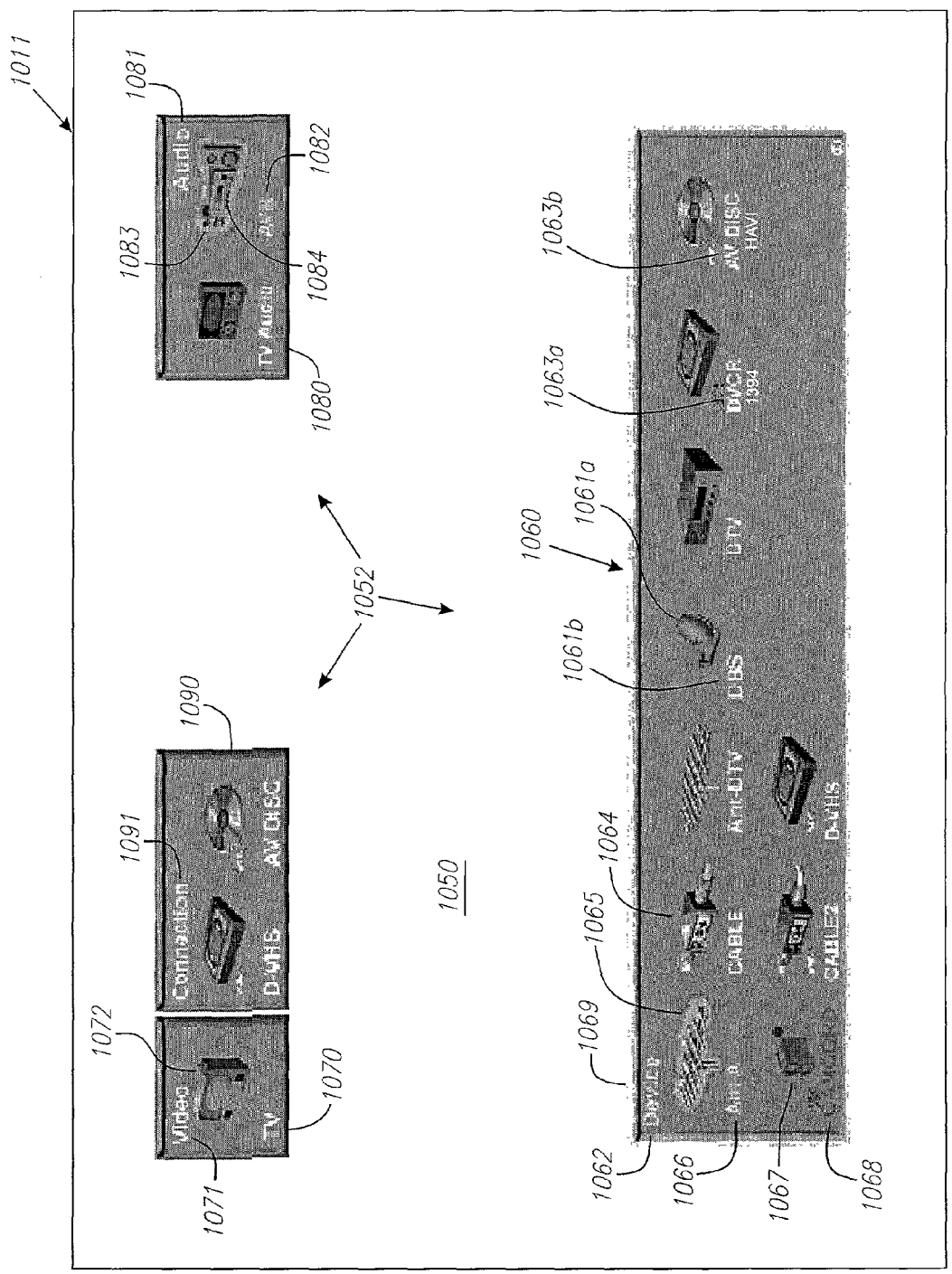
FIG. 2F is a graphical representation of a preferred embodiment of the graphical user interface of the control system of the present invention.

Turning to FIG. 2E, a PIP device selection menu 152 of the UI 50 of the present invention is shown displayed in the main video 13 on the screen 11 of the DTV 12. The PIP device selection menu 152 comprises a PIP device selection window 160, which is substantially the same as the device window 60 of the device selection menu 52, and a PIP video window 170. A PIP icon 172 in the PIP video window 170 corresponds to the PIP or sub picture 14 of the screen 11 of the DTV 12. A primary highlight, shown as a bold outline about the VCR icon 63, may be used to indicate the device icon currently selected while navigating through the PIP device window 160. A secondary highlight, shown as a cross-hatch within the DVD and PIP video icons 64 and 172, may be used to indicate the current AV source device and the current video sink device, i.e., the sub picture 14 of the screen 11 of the DTV 12. A tertiary highlight, shown as a graying-out of the D-VHS VCR Digital Cable or Satellite Receiver, Digital DVD and Digital AV Disc device icons 66-69, may be used to indicate that the device is unavailable as a source for PIP video. For example, if a digital source can not be used as a PIP source when the video signal to the main picture 13 of the DTV 12 is an analog signal, the digital source device icons, as depicted, will be grayed out to indicate they are not available as a PIP device option. No highlighting, however, may be used to indicate a device is connected to the HTNS 10 and available as a PIP video source device.

Figure 3A:
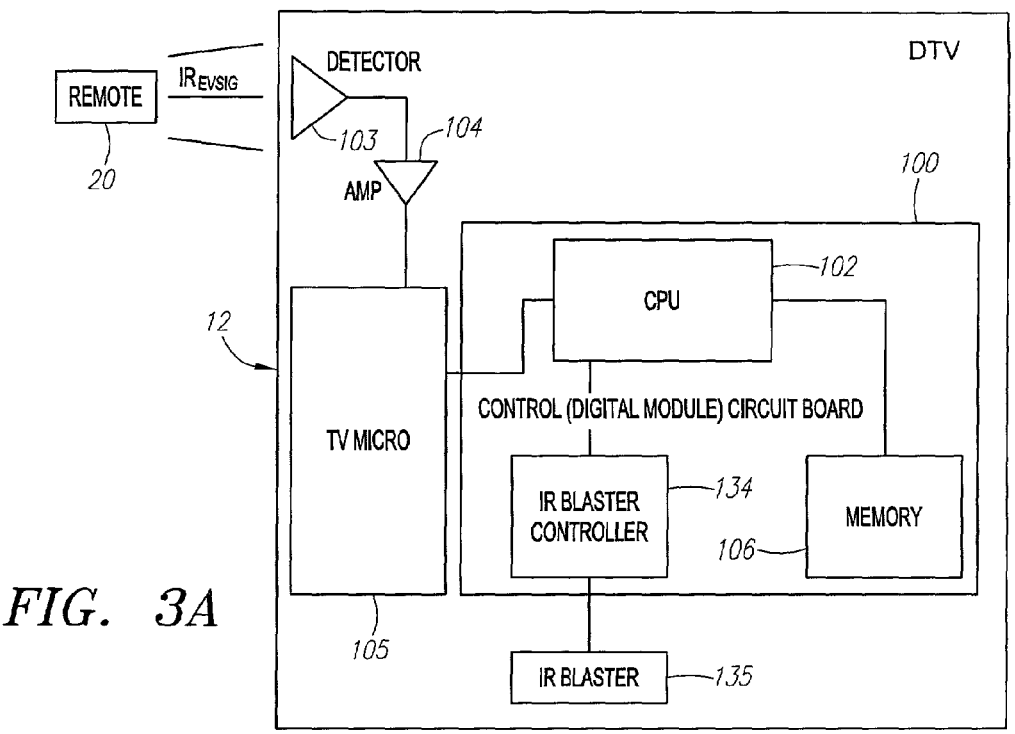
FIG. 3A is a schematic of a remote control and a television in accordance with the present invention.

FIG. 3A shows a schematic diagram of an embodiment of the DTV 12 of the present invention. As depicted, the DTV 12 preferably comprises an IR signal detector 103 for detecting IR event signals transmitted from a remote control device 20. The IR detector 103 is preferably coupled to a signal amplifier 104, which, in turn, is connected to a TV control (TV micro) circuit board 105. The TV micro 105 includes programmable logic, such as software, to control TV specific task and functions such as the clock, audio output, video output, volume up and down, channel up and down, I/O port switching, and the like in a manner similar to conventional TVs. In a preferred embodiment, the TV micro 105 decodes incoming commands, including those from the control panel 16, and acts to filter out all IR signals not intended for the control system of the HTNS of the present invention and forward intended signals to the HTNS control (digital module) processor or circuit board 100. The HTNS control circuit board 100 is coupled to the TV micro 105 and comprises a main computer processing unit (CPU) 102, a memory module(s) 106, and an IRC device (IR blaster) control processor 134, which is connected to an IR signal emitter (blaster/repeater) 135. The IR blaster 135 is used to transmit IR signals to external IRC devices. The HTNS integrating control subsystem or digital module of the control system of the present invention, which is discussed in regard to FIGS. 5 and 6, includes programmable logic incorporated in the control circuit board 100 and/or, as in a preferred embodiment, software programmable logic that runs or operates on the digital module circuit board 100. Although depicted as separate circuit boards, one skilled in the art would understand that the TV micro 105 and the control circuit board 100 may be combined as one circuit board.

Figure 3B:
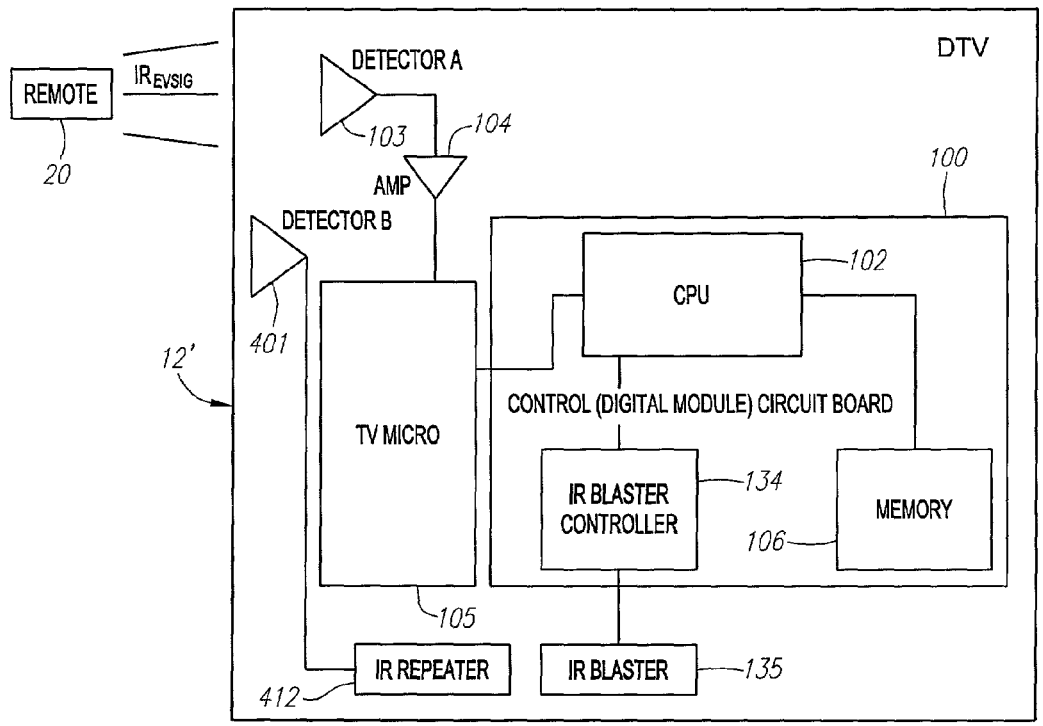
FIG. 3B is a schematic of the remote control and an alternative embodiment of the television shown in FIG. 3a including IR pass-through circuitry.
Figure 3C:
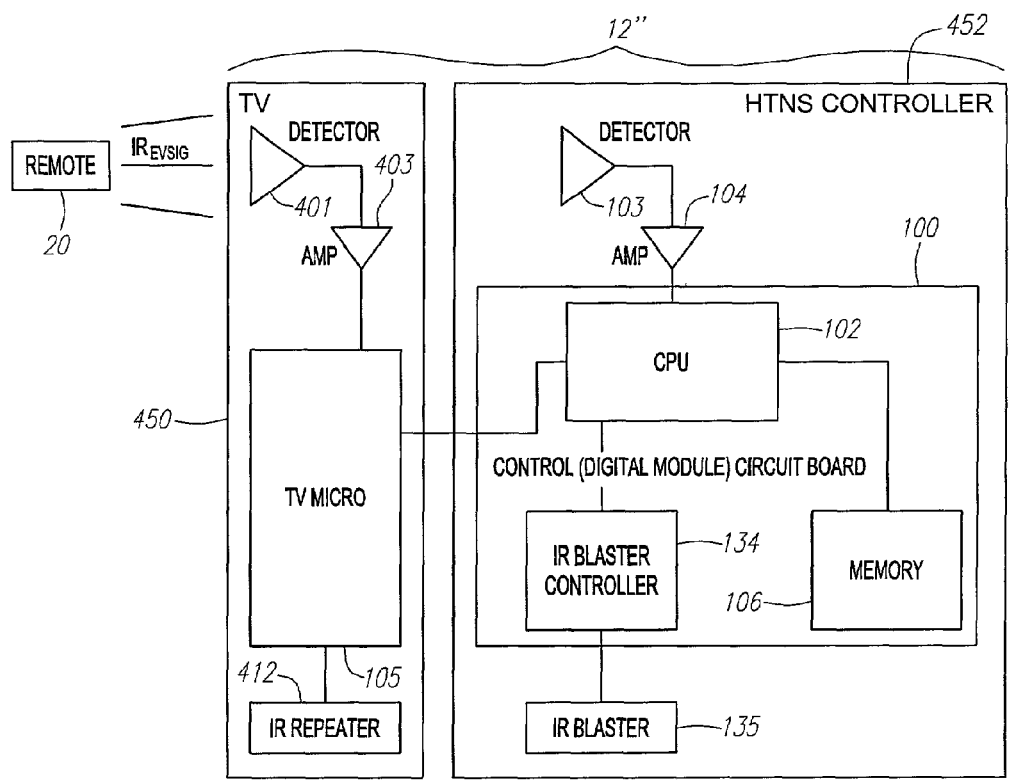
FIG. 3C is a schematic of a remote control and a primary display and control unit in accordance with the present invention comprising a television and a separate HTNS controller.
Figure 3D:
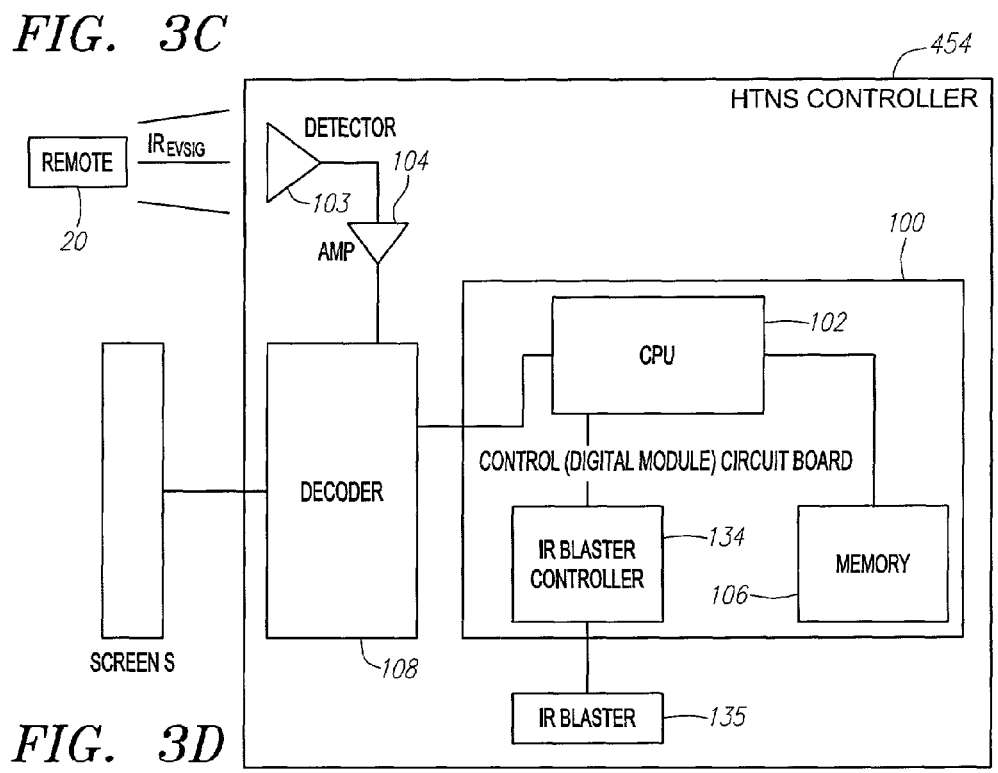
FIG. 3D is a schematic of a remote control and a primary display and control unit in accordance with the present invention comprising a monitor or display and a separate HTNS controller.

FIGS. 3B-3D show alternative embodiments of a PDCU of the present invention wherein like elements are labeled accordingly. In FIG. 3B, the DTV 12', as depicted, includes IR signal pass-through circuitry comprising a second IR detector 401 connected in series to an IR repeater 412. With this circuitry, the DTV 12' may transmit IR signals received by the detector 401 to external devices without any translation or decoding. In the alternative, the IR repeater 412 and IR blaster 135 may be combined as a single emitter/transmitter.

As shown in FIG. 3C, a PDCU 12" of the present invention may comprise a TV 450 and a HTNS controller 452 coupled to the TV 450. The TV 450 may be a conventional TV having an IR detector 401 connected to an amplifier 403, which is connected to a TV micro 105. The TV 450 may also comprise an IR repeater 412 to transmit IR signals received by the IR detector 401 to external devices. As depicted, the HTNS controller 452 preferably comprises an IR signal detector 103 for detecting IR event signals transmitted from a remote control device 20. The IR detector 103 is preferably coupled to a signal amplifier 104, which, in turn, is connected to the HTNS control circuit board 100. The circuit board 100 may include a decoder that acts to filter out all IR signals not intended for the HTNS controller 452. The HTNS control circuit board 100 preferably comprises a main computer processing unit (CPU) 102, a memory module(s) 106, and a IRC blaster control processor 134, which is connected to an IR blaster 135. The IR blaster 135 is used to transmit IR signals to external devices. The HTNS integrating control subsystem or digital module of the control system of the present invention preferably includes programmable logic incorporated in the control circuit board 100 and/or, as in a preferred embodiment, software programmable logic that runs or operates on the digital module circuit board 100.

Referring to FIG. 3D, a dedicated HTNS controller 454 is shown coupled to a "slave" monitor or display screen S. The HTNS controller 454 preferably comprises an IR detector 103 connected to an amplifier 104, which is connected to a decoder 108 that acts to filter out all IR signals not intended for the HTNS controller 454 and forward intended signals to the HTNS control circuit board 100. One of skill in the art would understand that the decoder 108 could be combined with the HTNS circuit board 100 as a single circuit board. The HTNS control circuit board 100 preferably comprises a main computer processing unit (CPU) 102, a memory module(s) 106, and a IRC blaster control processor 134, which is connected to an IR blaster 135. The IR blaster 135 is used to transmit IR signals to external devices. The HTNS integrating control subsystem or digital module of the control system of the present invention preferably includes programmable logic incorporated in the control circuit board 100 and/or, as in a preferred embodiment, software programmable logic that runs or operates on the digital module circuit board 100. Alternatively, the HTNS controller 454 may comprise a conventional computer upon which the control system, in the form of software programmable logic, operates.

Figure 4:
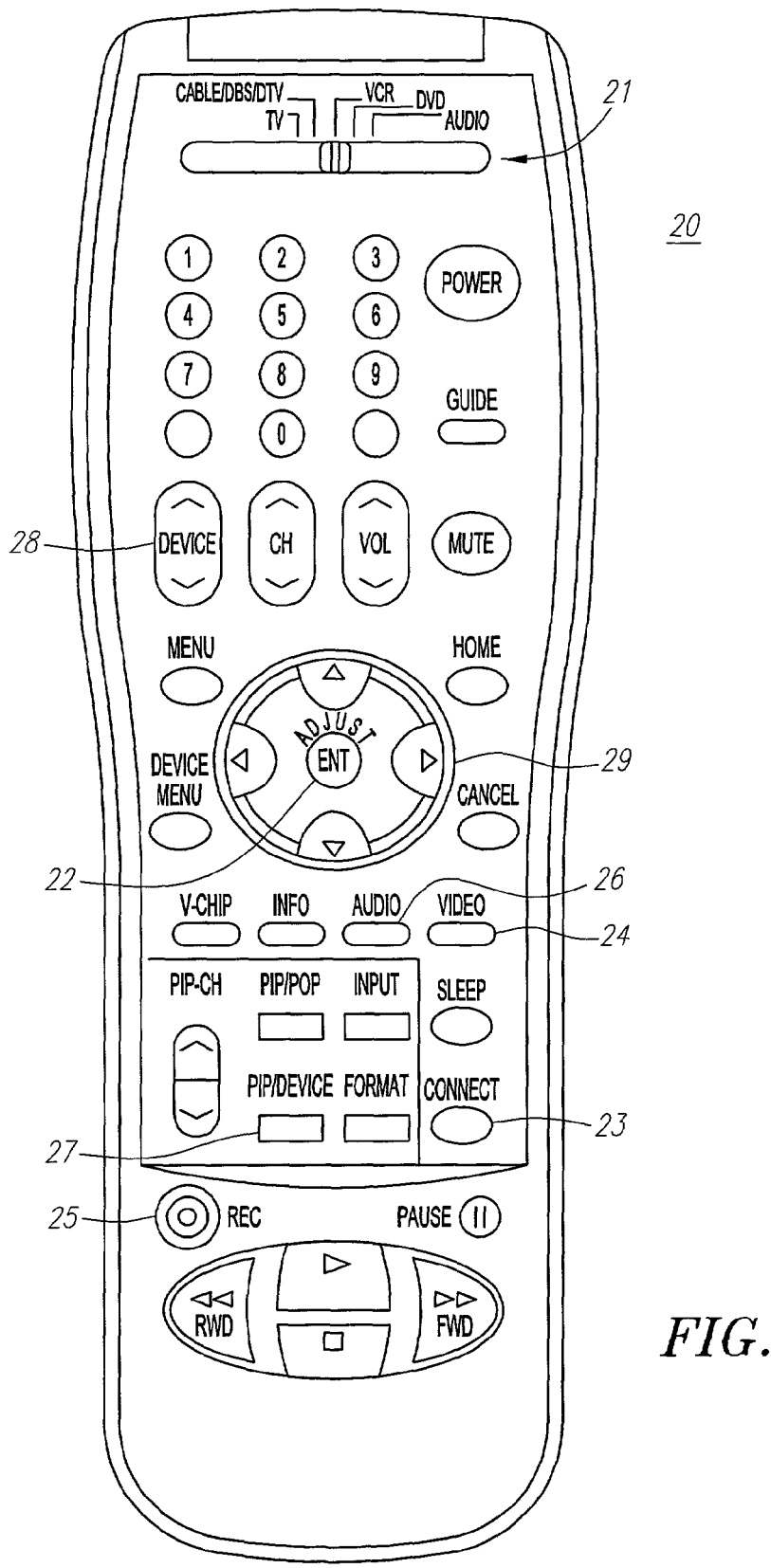
FIG. 4 is a plan view of a remote control for the home theater network system of the present invention.

Turning to FIG. 4, an IR signal emitting remote control 20 of the present invention is shown. As depicted, the remote 20 includes many of the same function keys and buttons, for example, number keys, channel up and down, volume up and down, power, mute, PIP/POP, play, stop, FFWD, REW, adjust, and the like, as conventional universal remote controls, and tends to operate in a like manner. The remote 20 includes a control layer lever switch 21 to enable switching between layers to control a TV and other devices such as a cable box, a digital TV, a digital broadcast satellite tuner, a VCR, a DVD or an audio device. However, when used with the control system of the present invention, the remote 20 may be operated on a single layer, i.e., the TV control layer, to control and operate supported devices within the HTNS 10. Preferably, the remote 20 also includes HTNS specific function keys or buttons. The HTNS function keys and buttons include a device key 28, which may be used to display the device selection menu 52 of the UI 50 of the HTNS 10 on the screen 11 in the main video 13 of the DTV 12 and navigate within the device window 60. The adjust key 29 may also be used to navigate through the device and audio windows 60 and 80, as well as the video and connection windows 70 and 90 to the extent these windows are navigable. Other HTNS specific function keys and buttons include audio, video and connection buttons 26, 24 and 23, which, along with device key 28, may be used to toggle between the device and the audio, video and connection windows 60 and 80, 70 and 90. The remote control 20 also includes a PIP device button 27, which may be used to initiate the selection of a PIP input device from a PIP device selection menu, shown in FIG. 2E. The record and connect buttons 25 and 23 on the remote 20 may be used to initiate recording and other peer-to-peer connections between source (input) and sink (recording) devices. The record button 25, like the "enter" button, may also be used to initiate recordings. The recording and other peer-to-peer connections may be over physical connection paths that include the DTV 12 or over connection paths that do not include the DTV 12. For recording between a digital 1394 source device and an analog sink device, the DTV 12 preferably incorporates a down-converter to enable such recordings.

Figure 5:
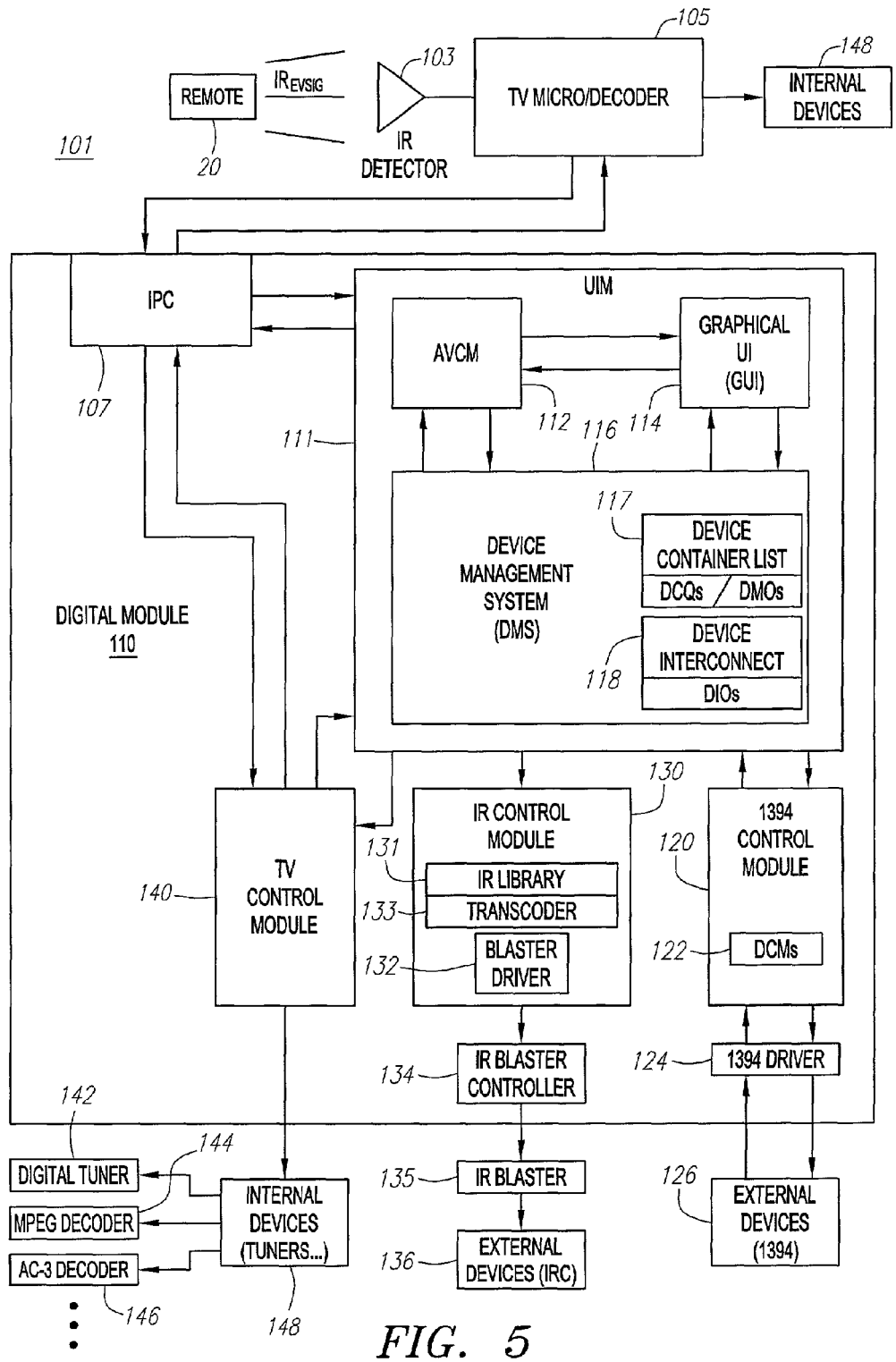
FIG. 5 is a schematic of a control system for the home theater network system of the present invention.
Figure 6:
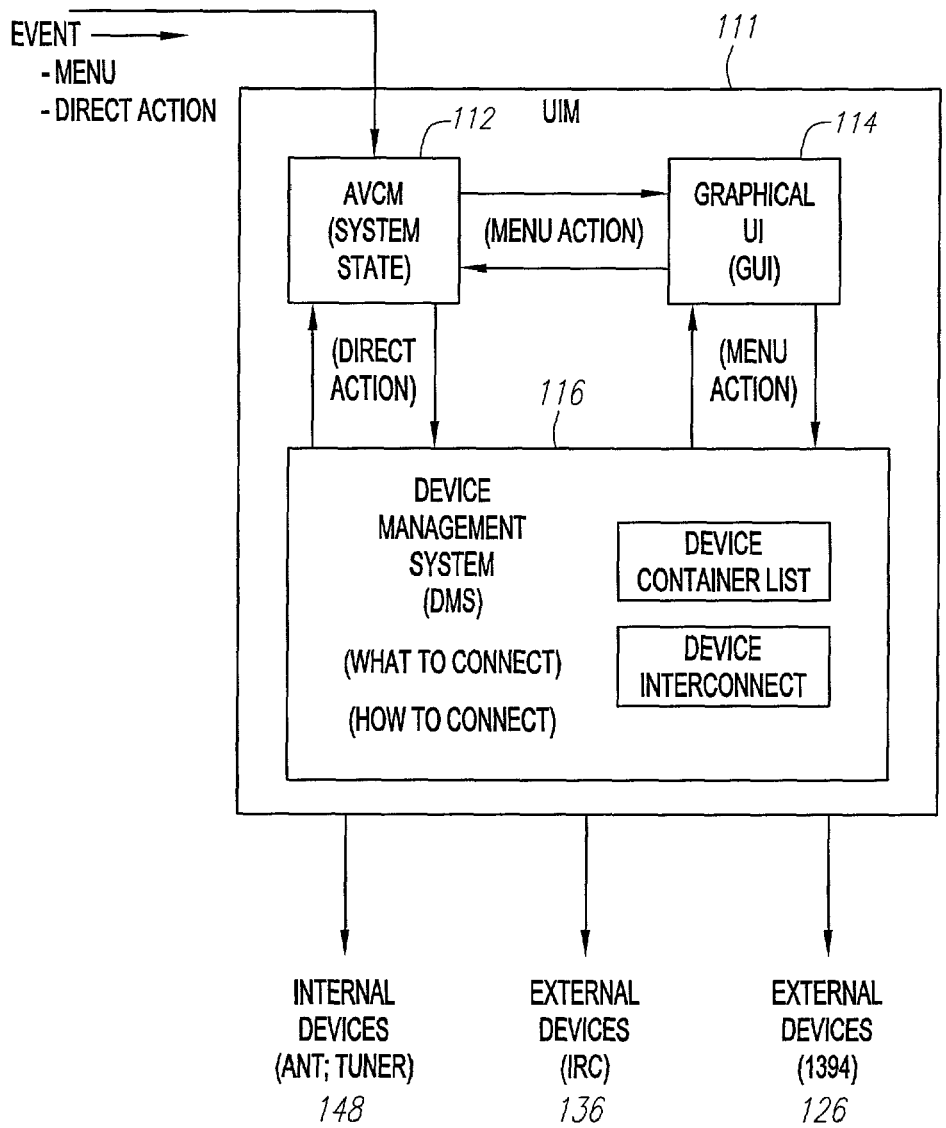
FIG. 6 is a schematic of a user interface module of the control system of the present invention.

As shown diagrammatically in FIGS. 5 and 6, the DTV 12 of the present invention includes a control system 101 comprising a remote control device 20, an IR detector (receiver) 103, a TV micro 105, and a HTNS integrating control subsystem or digital module 110. The IR detector 103 receives and amplifies the IR signal, which is then decoded by the TV micro 105. The TV micro 105 preferably filters out IR codes not intended for the DTV 12 of present invention. The IR codes intended for the DTV 12 are communicated to the digital module board 100 where they are acted upon by the digital module (DM) 110. The DM 110 is responsible for directing AV signals from external and internal devices to the main picture 13 and sub picture 14 of the DTV 12, or to one or more recorder or sink devices within the HTNS 10.

The DM 110 of the present invention advantageously enables centralized and seamless integrated control of the entire supported HTNS 10 including the DTV 12, its internal devices, both 1394 and IRC-type devices, as well as other inputs and system hardware interconnected to the DTV including 1394 compatible home appliances and lighting, heating, air conditioning and security-type systems, and the like. The DM 110 makes the entire operation and control of the supported devices within the HTNS 10 very user friendly. A user U can configure the control system 101 and, more particularly, the DM 110 with IRC device and device connection information and the user's preferences of 1394 devices within the HTNS 10. With this information, the DM 110 simplifies input switching and device operation for the user. For instance, the DM 110 and UI 50 will present the user with a list of choices to watch, the user U can select between these choices and rely on the DM 110 to do the necessary I/O port switching and device connecting.

With the DM 110 and UI 50, the user may advantageously operate all supported devices within the HTNS 10 with one remote control device on one layer, e.g., the TV layer of a universal remote control. The DM 110 and UI 50 will manage the details of communicating with external devices, whether IRC or 1394 devices, or a hybrid thereof. The DM 110 translates the commands from the remote as appropriate and issues commands in the language appropriate for the device being controlled, giving common, intuitive behavior across devices from within the HTNS 10. As a result, the user can use the same remote buttons to operate 1394 and IRC devices. While the remote control commands are being forwarded to external devices, the UI 50 may preferably display some on-screen indicator.

The DM 110 incorporates a translation function to translate incoming signals, such as a digital IR signal or the like, and a situation-dependent, context sensitive macro function. For example, in order to play a movie on a DVD with audio connected to an AV receiver input, the DM will switch (if necessary) the AV receiver's input and the DTV's input. The DM 110 will automatically switch audio to follow the video signal and do whatever other switching is necessary to output the DVD's audio. Further, the DM 110 may issue commands in the correct languages for the DVD and the AV receiver. The actions taken by the DM 110 are based on configuration information that the user has entered and on the current system state. Following the user entered configuration of AV receiver inputs, the DM 110 may switch inputs automatically between analog and digital sources. For AV receiver models that require it, the DM 110 may send a command when necessary to switch an AV receiver input between analog and digital.

Referring in detail to FIGS. 5 and 6, the subsystems or sub-modules of the DM 110 preferably include an interprocessor communication module (IPC) 107 to enable communication between the DM 110 and the software or other programmable logic of the TV micro 105, a user interface module (UIM) 111, a 1394 control module 120, a 1394 driver module 124, a IR control module 130, an IR blaster control module 134, and a TV control (TVC) module 140. The UIM 111, which provides the context sensitive macro capabilities of the DM 110, translates incoming event signals from the remote or TV control panel and, based on stored configuration data and current system state information, instructs the 1394, IRC and TVC modules 120, 130 and 140, as to what actions to take. The UIM 111 preferably comprises an AV connection manager (AVCM) module 112, a graphical user interface (GUI) module 114, and a device management system (DMS) module 116. The AVCM 112 and GUI 114 modules act in combination as an interpretation/translation layer to interpret the event signal commands from the remote 20 and translate these commands into instructions for the DMS 116 and TVCM 140 regarding what actions to take.

Preferably, the function of the AVCM 112 is to determine the current state of the HTNS 10 by querying the DMS 116, TVCM 140 and TV micro 105 as to devices connected to the system, active "in-use" device connections, active AV switching within devices and current TV operating parameters. For example, the AVCM 112 may determine from the DMS 116 that the active connections include an IRC cable box connected to the DTV, the video of an IRC VCR connected to the DTV and its audio connected to an AVR, and a D-DVD connected peer-to-peer to a D-VCR, from the TVCM 140 that the VCR's video is being directed to the main video of the DTV, the cable's video is being directed to the sub (PIP) video of the DTV and the device selection menu is currently displayed on the main video of the DTV, and from the TV micro 105 that the DTV's audio output is switched off. Once the system state is determined, the function of the AVCM 112 is to determine or interpret, based on the system state, whether an event signal is commanding a direct device action or a menu related action such as menu display, menu navigation or menu device action. If the event is a direct device action, the AVCM 112 instructs the DMS 116 and/or the TVCM 140 directly as to what device action is needed in a message that includes the current system state information. For example, if the video and audio of an Ant tuner were being output by the TV video and a receiver audio, respectively, and the user U pressed the "volume up" key on the remote control, the AVCM 112 would instruct the DMS 116 directly to raise the volume of the receiver audio. If the event is a menu-related action, the AVCM 112 communicates the event signal along with the current system-state information to the GUIM 114.

The GUIM 114 includes the UI 50 for the HTNS 10 and also the UI for the DTV 12, preferably expressible as graphical window objects. The function of the GUIM 114 is to determine or interpret whether the event requires the display of a menu or navigation within or between menus, or is a menu device action. If the event requires a device action, the GUIM 114 instructs the DMS 116 as to what device action is needed in a message that includes the current system state information. If the event requires menu display or navigation, the GUIM 114 instructs the TVCM 140 to display the menu in the main video 13 on the screen 11 of the DTV 12 with the current system state information. If the AV input signal being displayed in the main video 13 is an analog signal from an IRC device 30, the TVCM 140 generates a menu display signal, and then transmits the signal to the TV chassis and coordinates combining the input and menu display signals at the TV chassis of the DTV 12. In this instance, the menu appears opaque on the screen 11. If the AV input signal is a digital signal from a 1394 device 40, the menu display signal is combined with the input signal in the TVCM 140 and then transmitted to the TV chassis. In this instance, the menu preferably appears translucent on the screen 11.

The function of the DMS 116 is to determine based on current system state information and the device action instructions received from the AVCM 112 or GUIM 114, what devices to connect and operate, what device connections to break, how to accomplish the device connections and disconnects, and how to operate a particular device. As part of this function, the DMS 116 maintains, internal to the DMS 116, a device container list (DCL) 117 and a device interconnect list (DIL) 118. The DCL is a list, or database, of all the supported devices that make up the HTNS 10, including internal TV devices such as tuners, I/O ports and the like, external input IRC and 1394 devices, and other input devices connected to the DTV 12. Information about each device is placed into a device container object (DCO), which is stored in persistent memory 106. The DCO consists of a variety of information common to all devices regardless of device type, including such information as a logical device ID to keep track of the device in the system and used to link device icons to the appropriate device DCO, a model number ID to identify which device model object (DMO) is associated with the device, and for IRC devices, identify an IR code file, and an indication of whether the device is a 1394 device or not, etc.

While DCOs for internal TV devices are created in advance and stored in persistent memory, DCOs for external input devices are created by the DMS 116 during configuration setup as the user logs in each IRC device or the configuration setup system discovers and identifies a 1394 device connected to the DTV 12. As part of creating the DCOs, the DMS 116 assigns each device a logical device ID and a DMO number to the device as part of the DCO and notes whether or not the device is a 1394 device.

Upon system initialization, i.e., after AC power is applied to the DTV 12, the DCOs stored in persistent memory are read from storage by the DMS 116, an appropriate DMO is created and appended to a particular DCO based on the model number ID information contained in the DCO, and the DCO/DMO is placed in the DCL 117. Because 1394 devices are considered by the control system to be unit devices comprising logical sub-unit devices (preferably, up to 32 sub-units), the DMS 116 creates both a unit level DCO/DMO and a sub-unit level DCO/DMO. Each DCO/DMO sub-unit is linked to a common unit level DCO/DMO that represents the device as a whole. For example, a 1394 device might consist of a Tuner and an AvDisc sub-unit. Each sub-unit has a DCO/DMO created for it and these two sub-units are linked to a DCO/DMO that represents the device as a whole. The sub-unit DCOs are riot stored in persistent memory and are rediscovered each time the device is found on the 1394 network. As a result, when a 1394 device is discovered, the DMS 116 scans the DCL 117 for a DCO/DMO for that particular device. If the DCO/DMO is in the DCL 117, then only the sub-unit DCO/DMOs are created and attached to the unit level DCO/DMO in the DCL 117. If the DCO/DMO is not in the DCL 117, then the unit and sub-unit level DCO/DMOs are created with the unit level DCO/DMO added to the DCL 117 and unit level DCO added to persistent storage.

The DMOs, which are embedded in the DMS, include device-type specific information common for all VCR-type devices, DVD-type devices, etc. The DMS 116 creates and maintains each instance of a DMO that understands the details of connection and communication with a particular AV device, whether it is an internal TV device or an external device. The DMOs comprise a collection of device specific functions that know how to interface with the input device. The DMOs include details of the device's capabilities including, but not limited to, how to control the device, what functions the device can perform, which functions the device cannot perform, and all the I/O capabilities of the device. Remote commands, routed to the correct DMO, tell what the user wants to do to that device. The DMOs also preferably comprise information on how to interface with the appropriate control module corresponding to the device. The information contained in the DMOs is preferably defaulted for the IRC versions of each device-type. Some of the information, however, such as audio and video parameters like picture brightness, stereo/mono, and the like, may be user modifiable.

With the appropriate DMD appended to the DCO, the DCO/DMO contains information that is needed to control the device and support the UIM 111. Accordingly, the DCO/DMOs preferably comprise information such as a unique device identifier (logical device ID), a device model identifier (Model Number), a viewer's preferred name, a viewer's preferred icon ID, a device type (video/audio source, video/audio sink, video/audio record sink, or AV switch), AV pathway (analog, digital, both), digital pathway protocol, UI menu pathway, permanent, ignore and connected to bus flags, preferred audio settings, preferred video settings, preferred format setting, and the like.

The DIL 118 is a list, or database, of all the physical device connections in the HTNS 10. The DIL 118 contains all of the device connection ports and connection paths between the ports in the HTNS 10. To create a connection port, the I/O capabilities of a device are obtained from the DMOs. Each connection port is placed into a device interconnect object (DIO), which is stored in persistent memory. The information provided for a port by the DMO preferably includes port number, content—video, audio or both, direction—input, output, or recording input, and type—analog or digital. The DIL 118 also maintains the active "in use" connections between devices when an AV source is actively connected to an AV sink. Active connections can move along the physical connection paths and pass through AV switch devices. Preferably, the chassis of the DTV 12 of the present invention is modeled as an AV switch device and the majority of AV connections pass through it. Active connections can come and go as the user changes AV sources and sinks, but physical connections always remain intact. The DMS 116 can establish active connections from a source to a sink even if the video and audio take different paths.

As part of the configuration system, 1394 devices are preferably automatically connected to a 1394 virtual switch DCO/DMO. The virtual switch has an unlimited number of I/O ports,. Thus, when a DIO for a 1394 device is created, a DIO is created for the 1394 virtual switch and the connection information between the device and the virtual switch is established. Connections between the virtual switch and the device are considered by the DMS 116 to be physical connections.

The DMS 116 also maintains an IR Device list, an AVR Input Name list, and an AVR Input Default list. Upon system initiation, a list of all IRC devices is read from persistent storage and placed into the IR Device List. Each entry in the list contains several fields of information including, but not limited to, Device Type (VCR, DVD, etc.), Model Number (a unique number), Manufacturer Name, Manufacturer Model Name, IR Blasting Filename, and a set of special function flags. A list of AV Receiver input names is also read from persistent storage and placed into AVR Input Name List. Lastly, a list of AV Receiver default input settings is read from persistent storage and placed into a list called the AVR Input Defaults List. These defaults are used during the Initial setup configuration operation. There is also a collection of IR Code files that contain the actual IR Codes for each remote control device key that is supported for each device. There is one file for each device. The IR Code files are stored in persistent storage.

As part of the setup configuration system discussed below, the GUIM 114 uses the Manufacturer Names and Model Names from the IR Device list for presenting IRC devices to the user for selection when adding a new device. The AVR Input Name List is also used by the GUIM to present the AVR Input Names to the user in the Connection screen discussed below. When the Manufacturer and Model are selected, a uniquely identifiable Model Number is created for the device. When a DCO/DMO is created by the DMS 116 that will use the IRC module for communication, a message is sent to the IRC module 130 that associates a Model Number with an IR Code File. The IRC module 130 then loads the IR Code File data from persistent storage into memory (IR Code Library) for future use and associates the specified Model Number with that set of IR Codes. The Model Number and IR Blasting Filename is used by the DMS 116 to tell the IRC module 130 specifically what to blast when a command or message to blast is received by the IRC module. The message or command will include the Model Number and the Key Code to blast.

With the current system state and the required device action known, the DMS 116 accesses the DCL 117 and DIL 118 to retrieve specific information from the DCO/DMOs and DIOs necessary to make and break connections between devices, operate switching between I/O ports of an AV switch, operate specific devices and interface with appropriate control modules. From this information, the DMS 116 formulates instructions or messages that are communicated to the 1394, IRC and TV control modules 120,130 and 140, and the TV micro 105 to accomplish the requested device action. All instructions or requests for operating the AV switches of the DTV 12 are sent via the TVCM 140 to the TV micro 105. The DMS 116 also modifies the DIL 118 to reflect the new active "in-use" device connections.

The function of the input device control modules 120, 130 and 140 is to transmit the commands or instructions from the DMS 116 to the chosen input device in a device appropriate manner. The DM 110 of the present invention, however, supports a wide variety of the 1394, IRC and internal TV AV devices—e.g., camcorders, DVD players, VCRs, and set-top boxes, audio decoder/amplifiers, antenna tuners, AV receivers and the like. To communicate and control a wide variety of 1394 devices, the 1394 control module 120 preferably maintains a device control module (DCM) 122 for each 1394 device within the HTNS 10. The DCMs 122 are software that takes the commands or instructions from the DMS 116 and transforms them to a device-specific message. Therefore, with DCMs 122 for every 1394 device, the DM 110 can pass remote commands such as change channels, PLAY, STOP and the like, to the DCM for that device and have the commands transmitted to the device in a device specific way via a 1394 driver 124. The 1394 driver provides appropriate interfacing between the 1394-control module 120 and external 1394 devices 126.

Preferably, the DM 110 provides embedded DCMs for common 1394 AV devices as part of the 1394 control module 120, is capable of hosting Java DCMs communicated from the 1394 devices themselves, and is capable of executing Java Havlets (retrievable from the Internet) that are associated with the DCMs of 1394 devices. The DM 110 also preferably supports device embedded DCMs through the 1394 control module 120. Embedded DCMs are controllers for a specific device written in a CPU-specific language (not Java.) A 1394 device may contain embedded DCMs to support certain other devices, typically IRC devices that it expects to see. Since an IRC AV device does not present a DCM of its own, some other device (a 1394 device) in the HTNS 10 must provide the DCM. Lastly, the DM 110 arbitrates with other HAVi FAVs/IAVs to distribute the load of DCMs to be hosted and, thus, the control of 1394 devices 40 within the HTNS 10.

To communicate and control a wide variety of IRC devices, the IRC module 130 transforms the commands or instructions from the DMS 116 into device appropriate messages comprising device specific IR code. The IRC module 130 maintains the IR code library or database 131. The IRC module 130 also includes a translation layer (transcoder) 133 that converts the commands or instructions to the correct IR code to be transmitted to the chosen external device 136. Based on the information from IR code library 131, which includes the modulation parameters (carrier frequency, duty cycle), and some representation of the ons and offs that represent the command, and DCO/DMOs in the DCL 117, the correct IR code for the device 136 in focus is synthesized. The transcoder 133 or communication handler then makes up a message or packet containing the IR code. The packet is then sent to a blaster micro controller 134 over a serial link via a blaster driver 132. The blaster controller 134 then transmits the packet or message via an IR blaster 135 to the external devices 136. The IR blaster 135 is preferably an IR emitter or repeater. The blaster controller 134 preferably sends messages in a manner required by the device as indicated by the DCO/DMO of the device. For example, some devices may expect two repetitions of the same message before responding. The blaster controller 134 may send the same command several times in succession if needed.

The TV control module 140 operates all of the TV hardware, i.e., the internal input devices 148, such as, for example, a digital tuner 142, a mpeg decoder 144, and an AC-3 decoder 146 and the like. The TVCM 140 manages the state of the signals on the screen, including which signal appears in the main and sub pictures and answers questions from the DMS 116 about what configurations are possible, e.g., what devices are available as PIP video sources. The TVCM 140 handles how a signal is displayed on the TV screen and how it sounds. This includes scaling, PIP/POP/Double-window, demux controlling, MPEG decoding, audio processing, NTSC video processing, and lip synch between audio and video decoders. Like the IRC and 1394 control modules 120 and 130, the TVCM 140 transforms the command or instructions from the DMS 116 into device appropriate messages to communicate with the internal input devices 148 of the HTNS 10.

The DM 110 of the present invention preferably includes a configuration setup subsystem that advantageously provides high connection permutation sensitivity within the DM 110. With the configuration setup subsystem, users are able to setup the connection configuration of the HTNS 10 in a first time out of the box initial setup mode. In an edit mode, the setup subsystem enables the user to change, modify (i.e., customized or delete existing configurations. In the initial setup mode, the user is provided with a pre-set configuration of IRC device input connections on the DTV 12 and instructed to connect the IRC devices 140 to the DTV 12 accordingly.

Figure 7A:
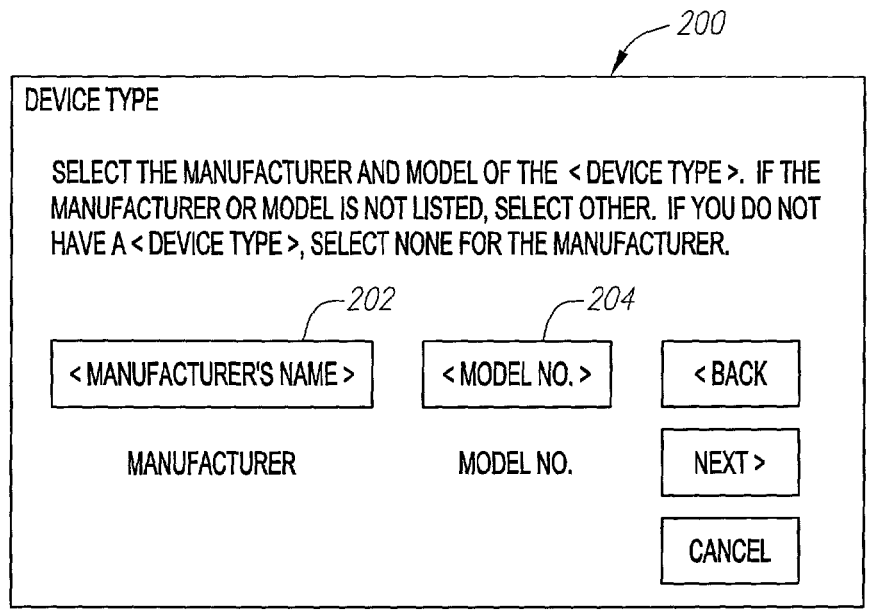
FIG. 7A is a diagram showing a device log in menu for a setup configuration subsystem of the present invention.
Figure 7B:
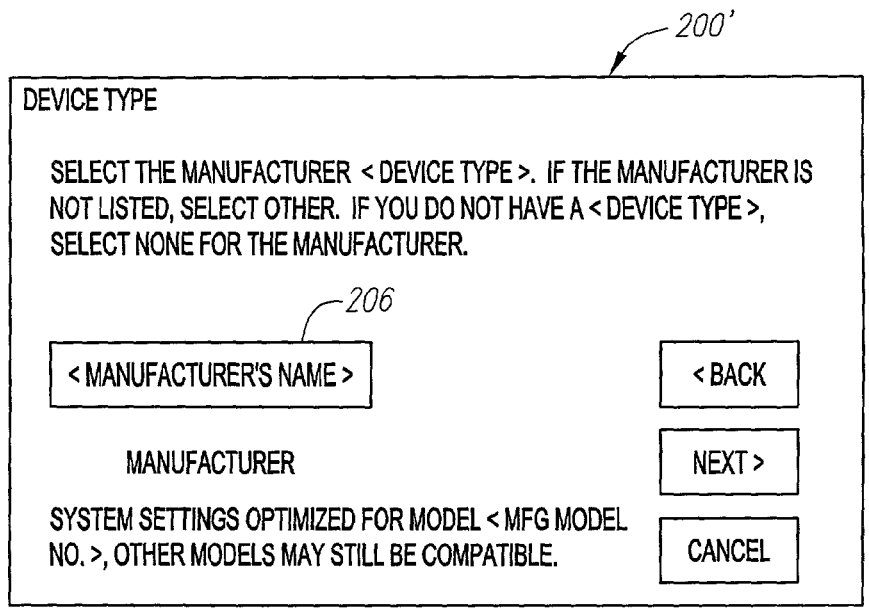
FIG. 7B is a diagram showing a preferred embodiment of the device log in menu.

In order to build the DCL 117 and DIL 118, and the DCO/DMOs and DIOs corresponding to the IRC devices 40 of the HTNS 10, a "device" menu 200 (see FIGS. 7A and 7B) is presented. The user fills out the device menu 200 to log in each IRC device corresponding to the devices in the pre-set connection configuration. The device menu 200 appears in the main video 13 on the screen 11 of the DTV 12 and may be filled out, navigated and controlled using the keys on the remote 20. Preferably, the device menu 200 indicates at the top of the box 200, where the word "device type" appears, which IRC device, i.e., VCR, DVD, cable, and the like, the user is being asked to log in. In particular, the user may be required to fill in the manufacture's name in the "Manufacturer" window 202 and the model number in the "Model No." window 204 as shown in FIG. 7A. Preferably, however, the user may be required to select a manufacturer from a pull down manufacturer menu window 206. When the user selects a manufacturer, the control system may present a message that the control system is optimized for a manufacturer's particular device model, as shown in FIG. 7B. The device type, the manufacture's name and the model number are then used by the DMS to build the DCO/DMOs and DIO for the supported devices.

Once all the IRC devices are logged in, a "review" menu 220 (see FIG. 8) is presented that enables the user to review the IRC devices 222 connected to the HTNS 10, their connections 223 to the DTV 12, and their connections 225 to an AV receiver, if such a device is connected to the HTNS 10. Because the DM 110 of the present invention incorporates the Device Discovery and Self-identification processes defined in the HAVi and AV/C specification, the 1394 devices 224 connected to the HTNS 10 will automatically appear as connected devices in the "review" window 220. In addition, if a new 1394 device is added, the DM 110 will automatically add it to the configuration. Lastly, the review menu 220 may be used to turn off or disable a particular input.

Figure 9A:
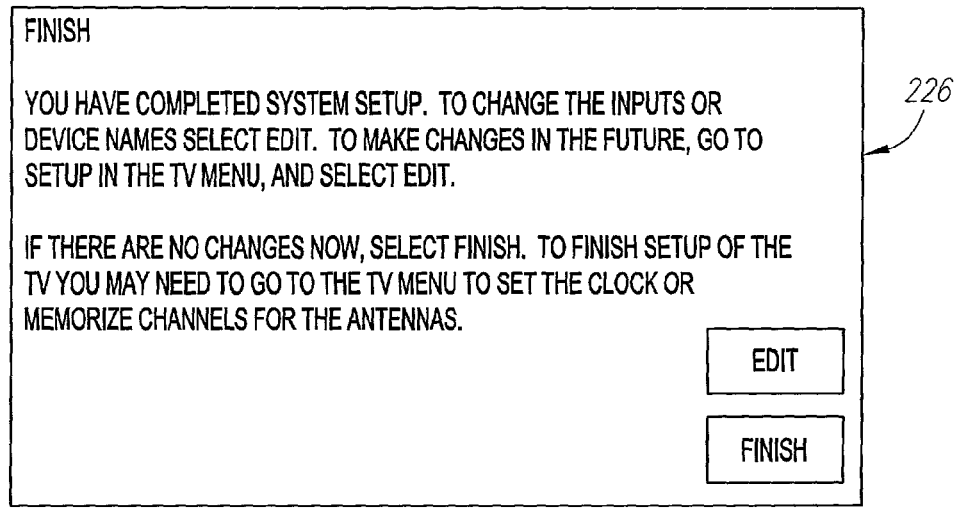
FIG. 9A is a diagram showing a finish menu for the setup configuration subsystem.
Figure 9B:
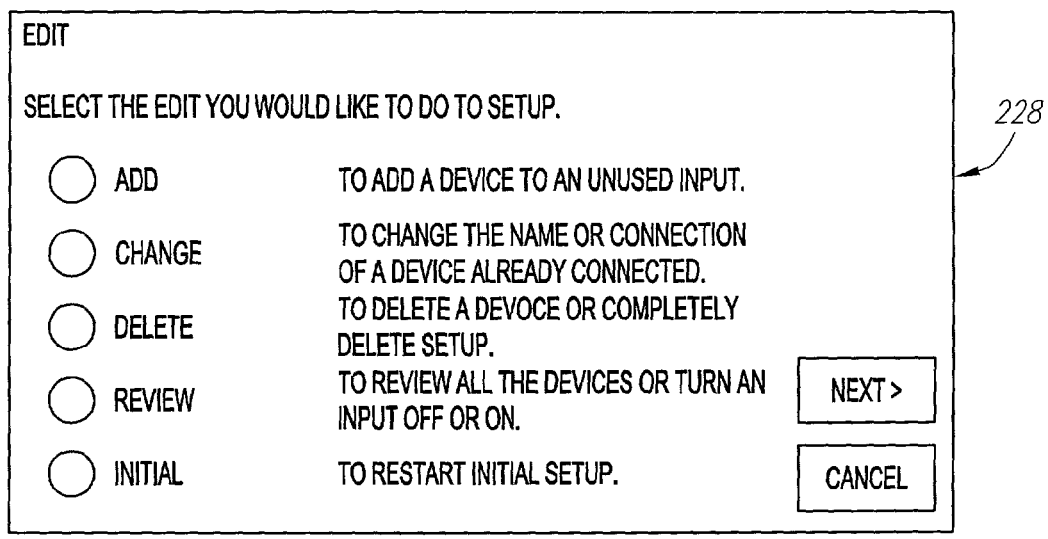
FIG. 9B is a diagram showing an edit menu for the setup configuration subsystem.
Figure 9C:
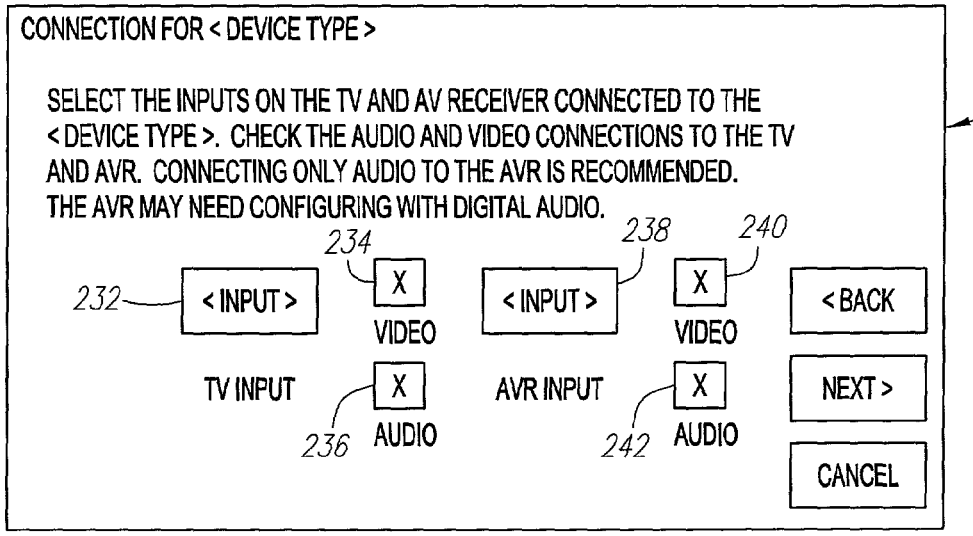
FIG. 9C is a diagram showing a device connection customization menu for the setup configuration subsystem.

To complete or edit the setup configuration, the user selects the "next" key in the review menu 220 to present a "finish" menu 226. (see FIG. 9A) The user may complete the setup configuration by selecting the "finish" key or edit the configuration by selecting the "edit" key. If the user selects the "edit" key, an "edit" menu 228 is presented. The edit menu 228 (see FIG. 9B) preferably allows the user to add an IRC device to an unused input on the DTV 12, change the name or connections of an IRC device already connected, delete a device or the entire setup configuration, return to the review menu 220 and turn an input on or off, or restart the initial setup subsystem. If "add" or "change" are selected, an "add/change" menu (not shown) is presented to allow the user to select what device the user wishes to add or modify. Once the user chooses the device to add or modify, the device menu 200 (FIG. 7A or 7B) is presented to allow the user to change the device manufacturer. When complete, the user selects "next" and is presented with a "name" menu (not shown), which allows the user to change the name of the device to a user preferred name. When complete, the user selects "next" and is presented with a "connection" menu 230. (see FIG. 9C) The connection menu 230 enables the user to customize the connections of an IRC device to the DTV and/or an AV receiver. To add, modify, change or customize the connections of the device identified in the TV input window 232 to the DTV, the user may identify whether the input device's video and/or audio are connected to the TV by selecting the audio and video boxes 234 and 236. To add, modify, change or customize the connections of the device identified in the AVR input window 238 to an AV receiver, the user may identify whether the device's video and/or audio are connected to the AVR by selecting the audio and video boxes 240 and 242.

This procedure may be used to identify a "hybrid" 1394 device within the HTNS 10 and configure the hybrid 1394 device to operate as such within the DM 110. A hybrid 1394 device is a device capable of receiving analog and digital input and/or producing analog and digital output.

During setup (initial or edit), if "other" is selected for the manufacturer, an option to learn IR or other control codes of a device may be presented. A learning screen is presented that provides a list of buttons on a remote control device that can be supported and learned. After a button on the screen is activated (by a pressing of enter (or select) on the remote), the DM 110 is in learning mode awaiting IR code. The remote for the IRC device for which the codes are being learned is then pointed at the DTV 12, and the designated key pressed to allow capture of the IR code. A change in the appearance of the soft key (e.g., an addition of a checkmark) indicates which keys have been successfully added to IR code library. The learned IR codes are added to a newly created DCO/DMO for the device being added. The DCO/DMO behaves the same as those already in the DMS 116. When a device is added it is integrated with the already supported devices and will show up in the Manufacturer/Model screen just like the already supported devices during setup configuration. An entry in a learned devices database may be added as well and stored in persistent storage.

In operation, referring to FIGS. 1, 2A-2D, 3A, and 4-6, the user U may depress the device key 28 of the remote 20 to display the device selection menu 52 while watching a movie being played on the D-VHS VCR 41 and displayed on the main screen 13 of the DTV 12. This event signal is received and amplified by the detector 103, decoded by the TV micro 105 and transmitted to the UIM 111 of the DM 110. The AVCM 112 determines the current system state and, based on such information, that the event is a menu-related event. The AVCM 112 transmits the event and the system state information to the GUIM 114. The GUIM 114 determines, based on the current system state information, that the event is a menu display event and transmits a message to the TVCM 140 to display the device selection menu 52 in the main video 13 on the screen 11 of the DTV 12 with the current system state information and device options displayed.

With the device selection menu 52 displayed, as shown in FIG. 2A, the visual recognition system of the UI 50 provides the user with on-screen, real time visual recognition of the current system state, the current navigation within the device selection menu 52, and the devices connected to (i.e., device options within) the HTNS 10. Referring to the device window 60, the cross-hatching in the D-VHS VCR icon 66 indicates that the D-VHS VCR 41 is the current input device. The bold outline about the D-VHS VCR icon 66 indicates that it is the currently selected device icon for navigation within the device selection window 60. The DBS tuner icon 61 is grayed out, which indicates that the DBS Tuner 32 is disabled or unavailable possibly because the DBS Tuner 32 has been disconnected from the DTV 12, its power has been turned off, or the DM 110 does not know what the tuner is connected to because the video checkbox for the TV may have been unchecked in the connection screen or a device is recording off of the main TV video output. No other icon highlighting appears in the device window 60, which indicates that all other input devices corresponding to these icons are available for connection and operation.

Referring to the video window 70 in FIG. 2A, the cross-hatching in the TV video icon 72 indicates the main video 13 of the DTV 12 is the sink or output device for the video signal from the D-VHS VCR 41. Turning to the audio window 80, the AVR icon 84 is grayed out indicating that the AVR 37 is not available as an audio sink for the audio signal from the D-VHS VCR 41. The lack of highlighting in the TV audio icon 82 indicates that the TV audio 15 of the DTV 12 is not the current audio sink for the audio signal of the D-VHS VCR 41 and it is not the current selected menu icon during navigation within the audio window 80. The cross-hatching in the D-AVR icon 86 indicates that the D-AVR 44 is the current audio sink for the audio signals from the D-VHS VCR 41. The bold outline about the D-AVR icon 86 indicates that the D-AVR 44 is the current selected audio output icon during navigation within the audio window 80.

The user U may then depress the left arrow of the adjust button 29 on the remote 20 to navigate within the device window 60 of the device selection menu 52 to the adjacent icon 65 corresponding to a IRC AV device 35. As before, this event signal is received and amplified by the detector 103, decoded by the TV micro 105 and transmitted to the UIM 111 of the DM 110. The AVCM 112 determines the current system state and, based on such information, that the event is a menu-related event. The AVCM 112 transmits the event and the system state information to the GUIM 114. The GUIM 114 determines, based on the current system state information, that the event is a menu navigation event and transmits a message to the TVCM 140 to navigate to the next icon within the device window 60, transmits this information to the AVCM 112 and queries the AVCM 112 as to the corresponding system state, transmits the system state information to the TVCM 140 and instructs the TVCM 140 to display the current system state information and device options within the device selection menu 52.

In the device window 60, as shown in FIG. 2B, the bold outline about the IRC AV device icon 65 indicates that it is the currently selected device icon for navigation within the device window 60, while the cross hatching in the D-VHS VCR icon 66 indicates that the D-VHS VCR 41 is still the current input device. In the video window 70, the cross hatching in the TV video icon 72 indicates that the main video 13 of the DTV 12 is still the video sink for the video signal from the D-VHS VCR 41. Because the IRC AV device 35 is actively connected in a recording peer-to-peer connection with the IRC VCR 33, the connection window 90 is displayed. In the connection window 90, the VCR icon 92 indicates that IRC AV device 35 is connected to the IRC VCR 33 in a recording or some other peer-to-peer connection. In the audio window 80, the bold outline about TV audio icon 82 indicates that it is the currently selected device icon for navigation within the audio window 80 and is available for an audio connection with the IRC AV device 35. The AVR icon 84, which is not bold outlined, indicates that the IRC AV receiver 37 is available as an audio sink for the audio signal of the IRC AV device 35, but is not the currently selected icon for navigation within the audio window 80. The D-AVR icon 86 includes cross hatching to indicate that it is the current audio sink for the audio signal from the D-VHS VCR 41. The D-AVR icon 86 is also grayed out to indicate that the D-AV receiver 44 is unavailable as an audio sink for the audio signal from the IRC AV device 35.

The user U may again depress the left arrow of the adjust button 29 on the remote 20 to navigate within the device window 60 of the device selection menu 52 to the adjacent DVD icon 64 corresponding to the IRC DVD player 34. Again, this event signal is received and amplified by the detector 103, decoded by the TV micro 105 and transmitted to the UIM 111 of the DM 110. The AVCM 112 determines the current system state and, based on such information, that the event is a menu-related event. The AVCM 112 transmits the event and the system state information to the GUIM 114. The GUIM 114 determines, based on the current system state information, that the event is a menu navigate event and transmits a message to the TVCM 140 to navigate to the next icon within the device window 60, transmits this information to the AVCM 112 and queries the AVCM 1 12 as to the corresponding system state, transmits the system state information to the TVCM 140 and instructs the TVCM 140 to display the current system state information and device options within the device selection menu 52.

In the device window 60, as shown in FIG. 2C, the bold outline about the DVD icon 64 indicates that it is the currently selected device icon for navigation within the device selection window 60, while the cross hatching in the D-VHS VCR icon 66 indicates that the D-VHS VCR 41 is still the current input device. In the video window 70, the cross hatching in the TV video icon 72 indicates that the main video 13 of the DTV 12 is still the video sink for the video signal from the D-VHS VCR 41. In the audio window 80, the bold outline about the AVR icon 84 indicates that it is the currently selected device icon for navigation within the audio window and is available as an audio sink for the audio signal from the IRC DVD player 34. The TV audio icon 82, which is not bold outlined, indicates that the TV audio 15 of the DTV 12 is available as an audio sink for the audio signal from the IRC DVD player 34, and that the TV audio icon is not currently selected for navigation within the audio window 80. The D-AVR icon 86 includes cross hatching to indicate that it is the current audio sink for the audio signal from the D-VHS VCR 41. The D-AVR icon 86 is also grayed out to indicate that the D-AV receiver 44 is unavailable as an audio sink for the audio signal from the IRC DVD player 34. Alternatively, the D-AVR icon 86 may be grayed out with no cross-hatching when the device is unavailable as an audio sink.

Next, the user U may press the enter (or select) button 22 or some other appropriate key on the remote to select the current selections (highlighted devices) within the device selection menu 52. If the current selected icon corresponded to a 1394 device, a pop-up menu (not shown) would be presented providing the user with sub-unit options to choose from. The adjust button could be used to navigate between the sub-unit choices and the enter (or select) key could be used to select the desired sub-unit.

As before, this event signal is received and amplified by the detector 103, decoded by the TV micro 105 and transmitted to the UIM 111 of the DM 110. The AVCM 112 determines the current system state and that the event is a menu related event. The AVCM 112 transmits the event and the system state information to the GUIM 114. The GUIM 114 determines, based on the current system state information, that the event is a menu device action and transmits a message or command to the DMS 116 containing the current system state information and instructing the DMS 116 that the DVD player 34 has been selected as the input device, that the TV video 13 of the DTV is the video output device, and that the IRC AV receiver 37 has been selected as the audio output device. Based on the current system state information and device command, the DMS 116 queries the DCL 117 and DIL 118 for connection, I/O port, operation information and the like contained in the DCO/DMOs and DIOs, and then formulates an appropriate message, which it transmits to the TVCM 140 instructing the TVCM 140 to have the TV micro 105 switch the video input port from the port for D-VHS VCR 41, i.e., the 1394 port, to the port to which the IRC DVD player 34 is connected. The DMS 116 also formulates an appropriate message that it transmits to the 1394 control module 120 instructing it to stop or shut down the D-VHS VCR 41 and D-AVR 44. The 1394 control module 120 calls up the appropriate DCMs 122, which translate the instructions into device specific messages that the 1394 driver transmits to the DVHS VCR 41 and D-AVR 44 to stop or shut down the devices. The DMS 116 also formulates appropriate messages that it transmits to the IRC module 130 instructing it to operate the DVD 34 and the IRC AV receiver 37 and to perform the appropriate switching within the DVD and the AVR to enable an audio connection there between. The IRC module 130 accesses the IR code library 131 and formulates messages corresponding to the commands from the DMS 116 that contain device specific IR code for the chosen devices. The messages or packets are then transmitted serially to the IR blaster controller 134 via the blaster driver 132. The IR blaster controller 134 controls the transmission of the packets to the DVD player 34 and the AVR 37 via an IR Blaster 135 (emitter/repeater) and in accordance with the DCO/DMOs of the chosen devices.

At the same time the DMS 116 is seamlessly handling the switching and connection of the devices, the GUIM 114 is instructing the TVCM 140 to bring up the transport menu 54. The transport menu 54 provides the user U with a familiar set of control function buttons for operating external devices through the control system and interacts with the UI 50 and DM 110. The transport menu 54 includes a list of six icons corresponding to standard commands of "Rewind", "Play", "Forward", "Stop", "Pause", and "Record". The transport menu 54 may also be displayed when an external device is active and any of the keys corresponding to these standard commands is pressed on the remote 20. As depicted in FIG. 2D, buttons are grayed out that correspond to functions the selected device is incapable of performing, e.g., conventional DVD players can not record, therefore the record button is shown grayed out.

For IRC devices, the DM 110 preferably incorporates the display and operation of device specific control menus generated by the IRC device. The DM 110 preferably maps the display of such menus to the "menu" key on the remote. For 1394 devices, the DM 110 preferably incorporates "on-screen display" (OSD) controllers for displaying OSDs from external 1394 devices that provide them. The OSDs from these devices give access to unique features of those devices that are not part of the normal controls. For example, pressing the PLAY button will cause an AV/C D-VCR to begin playing. But the user can still access unusual features, such as a sophisticated "cueing by GOP" by accessing that AV/C D-VCR's menus. The DM 110 preferably incorporates ways to include the UI's of external devices as though they were extensions of its own. To do this, the DM 110 preferably incorporates AV/C Panel Controller functionality, HAVi DDI interface, and EIA-775A bitmap interface, a HAVi level-2 UI (havlet), and the like.

With the play button of the transport menu 54 highlighted, the user U may hit the enter (or select) key 22 or the play button on the remote 20 to begin playing the DVD player 34. As before, this event signal is received and amplified by the detector 103, decoded by the TV micro 105, and then transmitted to the UIM 111 of the DM 110. The AVCM 112 determines the current system state and that the event is a menu related event. The AVCM 112 transmits the event and the system state information to the GUIM 114. The GUIM 114 determines, based on the current system state information, that the event is a menu device action and transmits a message or command to the DMS 116 containing the current system state information and instructing the DMS 116 to have the DVD player 34 begin playing. Based on the current system state information and device command, "play", the DMS 116 formulates an appropriate message that it transmits to the IRC module 130 instructing to have the DVD 34 begin playing. The IRC module 130 accesses the IR code library and formulates a message corresponding to the play command from the DMS 116 that contains device specific IR code. The message or packet is then transmitted serially to the IR blaster controller 134 via blaster driver 132. The IR blaster controller 134 controls the transmission of the packet to the DVD player 34 via the IR blaster 135. The DVD player 34 begins to play with its video outputted on the main picture 13 of the screen 11 of the DTV 12 and its audio outputted from the IRC AV receiver 37. While the DM 100 is performing all the noted operations, the GUIM 114 may instruct the TVCM 140 to display a visual indicator that such activity is occurring.

For PIP operation, the user U may depress the PIP device key 27 on the remote 20 to display the PIP device selection menu 152, which, as depicted in FIG. 2E, comprises device and video windows 160 and 170 that appear substantially the same as the device and video windows 60 and 70 of the device selection menu 52. The sub-picture icon 172 corresponds to the PIP or sub picture 14 of the screen 11 of the DTV 12. The DM 110 acts to display the PIP device selection menu 152, and responds to navigation and device action commands in the same manner as discussed above in regard to the device selection menu 52. The GUIM 114, in coordination with the TVCM 140, indicates in the PIP device window 160 which input devices are available as a source device for the PIP video by graying out icons of those devices that are not available. For example, all icons corresponding to 1394 devices may be grayed out if the video signal to the main picture 13 is an analog signal.

Figure 10:
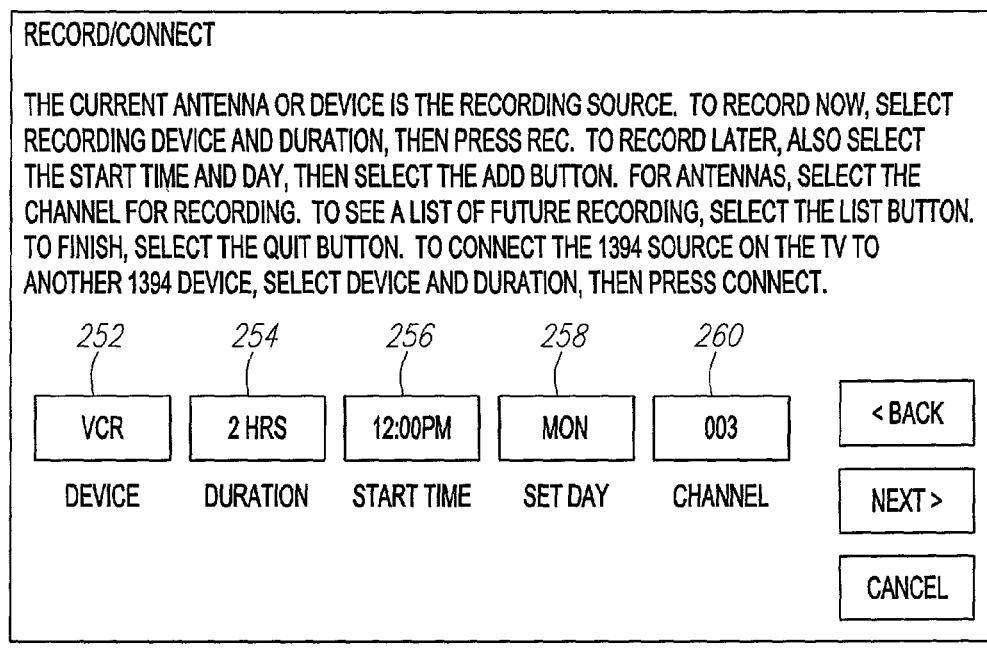
FIG. 10 is a diagram showing a menu for initiating recording or peer-to-peer connections.

For recording or other peer-to-peer connection operation, the user U may press the RECORD and Connect buttons 25 and 23 on the remote 20. In response, the DM 110 displays a Record/Connect menu 250 on the screen 11 of the DTV 12 wherein the current device is the source device. (see FIG. 10) To record immediately, the user U selects a recording device in the device window 252 and duration in the duration window 254, then presses the REC button 25 on the remote 20. To record at a later time, the user U also selects a starting time in the start time window 256 and day in the set day window 258, and then selects the Add button in the dialogue window 250 to store the future recording in persistent storage. For recording output from antennas, cable boxes, satellite boxes, and other devices with channel selections, the user selects the channel for recording in the channel window 260. For recording output from 1394 devices, a pop-up menu (not shown) would be presented providing the user with sub-unit options to choose from. The adjust button could be used to navigate between the sub-unit choices and the enter (or select) key could be used to select the desired sub-unit. To see a list of future recordings, the user U may select the List Button in the dialogue window 250. To connect a source device to a sink device in a peer-to-peer connection, the user U selects a device in the device window 252 and duration in the duration window 254, then presses the Connect button 25 on the remote 20.

The recording and other peer-to-peer connections may be over physical connections that include the DTV 12 or over physical connections, that do not include the DTV 12, such as, for example, the playing of a movie from a D-DVD 1394 device on an auxiliary 1394 video display device. As with other operations, the DM 110 receives the record or connect event signal and translates it to perform the necessary switching, make the necessary connections, and operate the chosen devices, all transparently to the user U.

The control system 101 of the present invention preferably synchronizes its blasting of IR messages to supported IRC devices with the messages coming from the remote 20, to blast during gaps between remote messages and thus avoid IR "jamming", as described in U.S. patent application Ser. No. 09/535,263 for "Protocol For Avoiding Interference Between Transmission Devices," which is incorporated by reference. IR jamming occurs when an external device cannot decode the commands blasted to it because the remote 20 is transmitting at the same time. The software on the remote 20 is preferably adapted to leave gaps during which the DM 110 can blast messages to other devices. The DM 110 preferably coordinates its IR transmissions with these gaps. The blaster 135 preferably has a means for communicating its busy/completion status to the DM 110.

After a user command from the IR remote 20 or the front panel 16 starts an operation, if preferred that operation may not be interrupted with another user command, with the exception of certain desirable cases. Also if preferred, user commands ignored because of any operation already in-progress may be discarded and not buffered for future use.

Figure 11A:
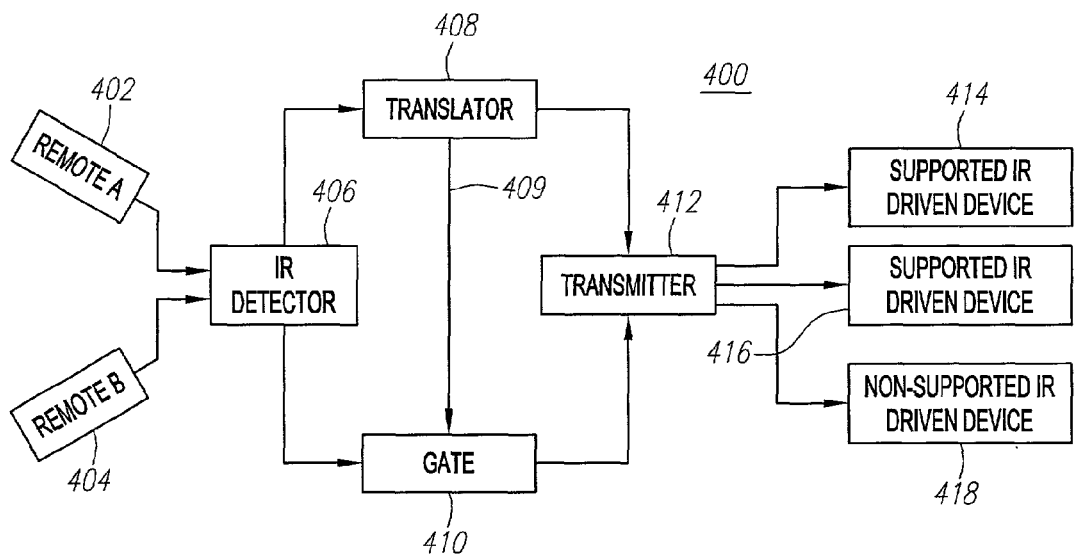
FIG. 11A is a schematic of an IR signal pass-through and control system of the present invention.
Figure 11B:
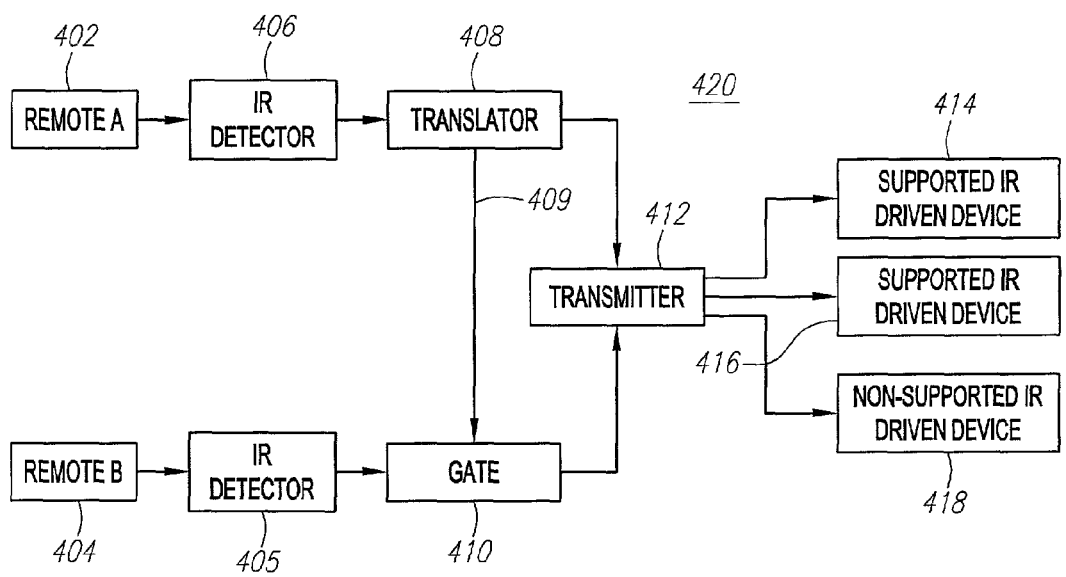
FIG. 11B is a schematic of an alternate embodiment of the IR signal pass-through and control system.

Optionally, as shown in FIGS. 11*a* and 11*b*, apparatus, systems and methods are provided to enable the pass-through IR control of non-supported IRC devices 418 in a network of consumer electronics systems or a HTNS 400, while avoiding jamming of IR signals. The HTNS 400 preferably comprises a translator subsystem 408, such as the DM of the present invention, and a IR signal blaster or repeater 412. In addition, the HTNS 400 includes a remote A 402 for controlling supported IRC devices 414 and 416 within the HTNS 400, an IR detector 406 serially connected to the translator subsystem 408 and an IR transmitter 412 for transmitting IR signals to supported and non-supported IRC devices 414, 416 and 418 serially connected to the translator 408. The HTNS 400 comprises another remote B 404 for operation of non-supported IRC devices 418. The second remote B 404 may alternatively be a second programmable layer on the supported device remote A 402. Because the translator subsystem 408 preferably does not recognize signals transmitted from the non-supported device remote B 404 or communicate such signals to the transmitter 412 for broadcast to the non-supported devices 418, a gate 410 is provided in the HTNS 10, which is serially connected to the detector 406 and the transmitter 412. The gate 410, however, is also serially connected to the translator 408 over a communication link 409. When the gate 410 is open, signals from the non-supported device remote B 404 are "passed-through" to the transmitter 412 for broadcast to the non-supported devices 418. When the gate 410 is closed, signals from either remote may not "pass-through" to the transmitter 412 and, thus, IR signal jamming at the transmitter 412 may be avoided. Operation of the gate 410 is controlled by the translator 408, which instructs the gate 410 to close once it begins acting on an IR event signal. The translator 408 will not instruct the gate to open until it has determined that the IR signal is unrecognizable, i.e., not from a supported remote, or until after the transmitter 412 has completed broadcasting signals to the supported devices 414 and 416. The transmitter 412 preferably has the capability to inform the translator 408 as to when it is and is not busy.

Alternatively, a HTNS 420 may include a first detector 406 serially connected to the translator 408 and a second detector 405 serially connected to the gate 410. Preferably, the first detector 406 is adapted to filter out all signals not originating from the supported device remote A 402. The second detector 405, which is preferably a wideband detector, is capable of detecting IR signals originating from the non-supported device remote B 404 and transmitting such signals to the gate 410 for pass-through to the transmitter 412. Operation of the gate 410 is controlled by the translator 408 in substantially the same way as in the previous embodiment.

Figure 12:
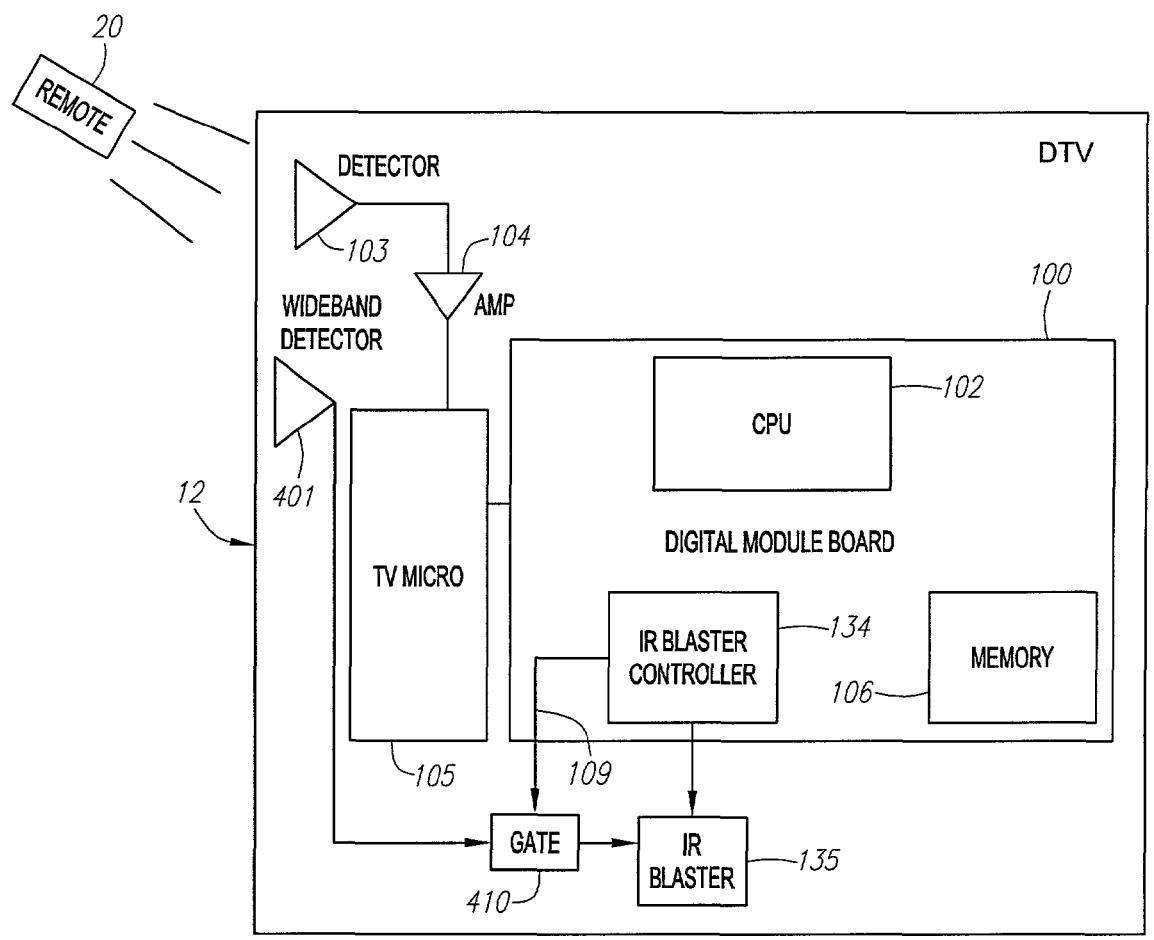
FIG. 12 is a schematic of a remote control and television for the home theater network system of the present invention with an IR pass-through and control system incorporated therein.
Figure 13:
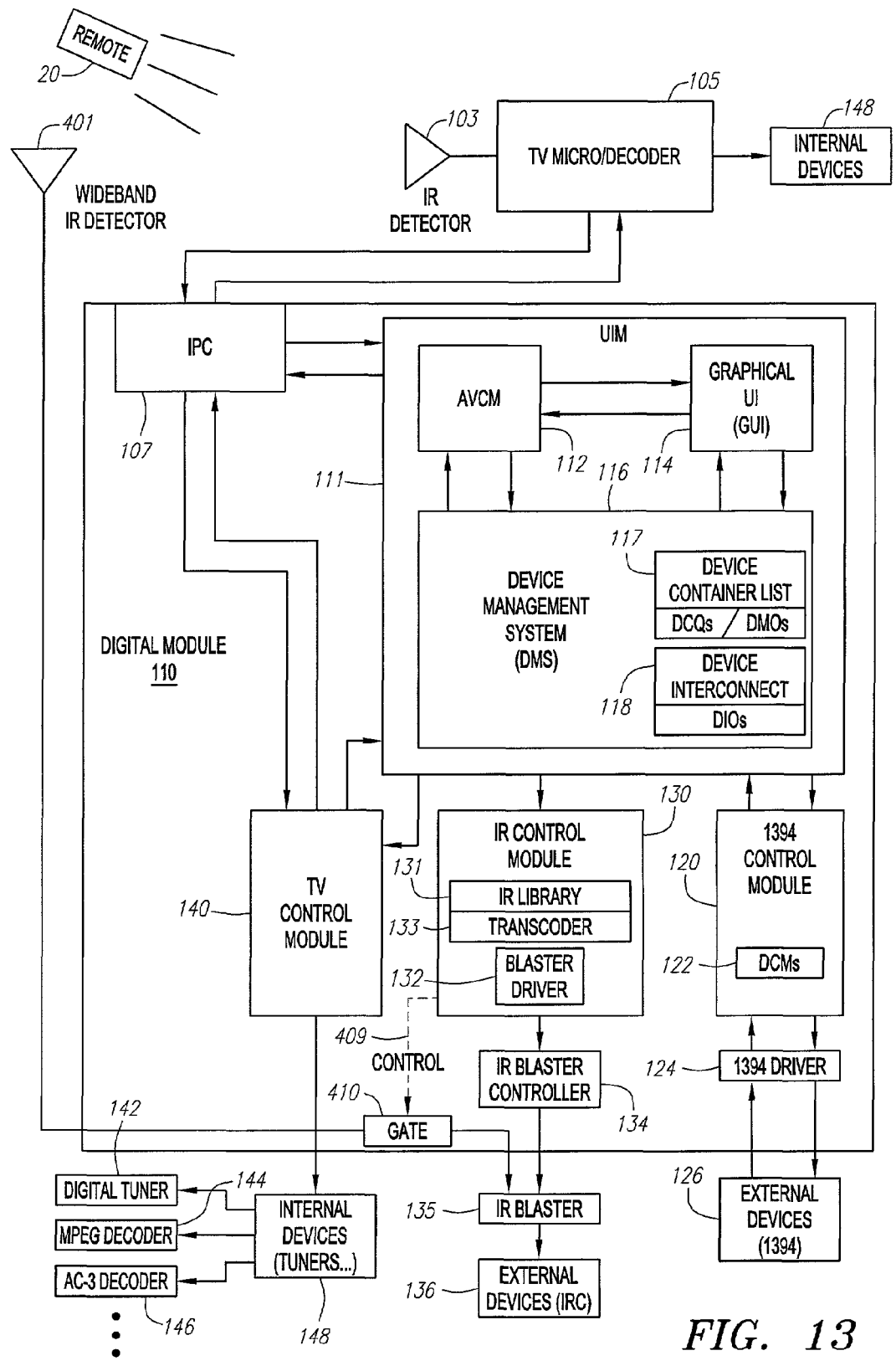
FIG. 13 is a schematic of a control system for the home theater network system of the present invention with an IR pass through and control system incorporated therein.

Turning to FIGS. 12 and 13, the IR pass through system for control of non-DM supported devices is shown incorporated into the HTNS 10 of the present invention. As depicted, a second wideband detector 401 is provided to detect IR signals not originating from a HTNS remote 20 or originating from a control layer other than the TV layer 23 on the HTNS remote 20 of the present invention. The detector 401 is serially connected to a gate 410, which is serially connected to the IR blaster 135 of the present invention and to the IRC module 130. When the gate 410 is open, signals detected by the wideband detector 401 are "passed-through" to the IR blaster 135 for broadcast to the non-supported external devices 136. When the gate 410 is closed, signals detected by the wideband detector 401 may not "pass-through" to the IR blaster 135 and, thus, IR jamming may be avoided. The gate 410 is controlled by the IRC module 130 which instructs the gate 410 to close once it begins acting on an IR event message received from the DMS 116. The IRC module 130 will not instruct the gate 410 to open until after the IR blaster 135 has completed broadcasting signals to the external devices 136. The IR blaster 135 preferably has the capability to inform the IRC module 130 as to when it is and is not busy.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit of the appended claims.

What is claimed:

1. A network system comprising
   a plurality of input audio-video devices including a mix of a first set of devices comprising one or more devices controllable over a bidirectional digital bus and a second set of devices comprising one or more devices incapable of being controlled over the bidirectional digital bus, and
   a command center comprising a control unit and a primary display coupled to the control unit and having a command input adapted to receive user input command center specific commands and a plurality of input and output ports to which each of the second set of devices of the plurality of input devices are directly coupled, the command center comprising a control system being adapted to translate user input command center specific commands to device specific output messages to directly drive the first set of input devices via signals communicated from the command center over a bidirectional bus and drive the second set of devices via IR signals sent from the command center to the second set of devices,
   wherein the control system being adapted to generate a graphical user interface (UI) displayable on the primary display screen of the command center and coupled to a translation module of the control system, the UI including a device selection menu comprising a plurality of icons corresponding to the plurality of input devices, and wherein the control system being adapted to direct an audio and/or video signal from a first source device of the plurality of input AV devices to a sink device of the plurality of input AV devices via device specific output messages transmitted from the control system to the plurality of input AV devices while directing a signal from a second source device of the plurality of input AV devices to the primary display screen of the command center, wherein the first and second source devices and the sink device include one or more analog AV devices selected from the plurality of input AV devices coupled to the network.

2. The network of claim 1 wherein the command center comprises an audio-video (AV) system.

3. The network of claim 2 wherein the AV system comprises a television.

4. The network of claim 1 wherein the control unit comprises a computer.

5. The network of claim 1 wherein the primary display unit comprises a television.

6. The network of claim 1 wherein the translation module is adapted to translate user input commands, and first and second control modules coupled to the translation module, the first and second control modules adapted to convert translated user input commands into device specific out put messages to drive the plurality of input devices.

7. The network of claim 6 further comprising a 1394 driver module coupled to the first control module, the 1394 driver module adapted to communicate device appropriate output messages to 1394 controlled devices of the first set of devices.

8. The network of claim 7 further comprising an IR emitter controller coupled to the second control module, and an IR emitter coupled to the IR emitter controller.

9. The network of claim 1 wherein the UI includes a device selection menu comprising a plurality of icon corresponding to the plurality of input devices.

10. The network of claim 9 wherein the device selection menu comprises a device selection window, a video sink window, and an audio sink window.

11. The network of claim 10 wherein the device selection menu further comprises a connection sink window.

12. The network of claim 9 wherein the UI further comprises a visual recognition system.

13. The network of claim 12 wherein the visual recognition system comprises three states of visual recognition.

14. The network of claim 13 wherein the three states of visual recognition comprise a disabled state, a current device state, and a selected device state.

15. The network of claim 12 wherein the visual recognition system comprises five states of visual recognition.

16. The network of claim 15 wherein the five states of visual recognition system comprise a disable state, a selected/current device state, a selected/not current device state, a not selected/not current device state, and a not selected/current device state.

17. The network of claim 6 wherein the translation module comprises a first module adapted to determine a current system state and whether an input command comprises a menu related action or a direct device action, a second module coupled to the first module, the second module adapted to determine whether a menu related action is a menu display action, a menu navigate action or a menu device action, and a third module coupled to the first and second modules, the third module adapted to determine what device connections to make and instructing the first and second control modules as to what device actions to take.

18. The network of claim 1 further comprising a user command input device operably coupled to the command center command input.

19. The network of claim 18 wherein the input device is a remote control.

20. The network of claim 19 wherein the remote control emits IR signals.

21. The network of claim 1 further comprising IR emitter cables operably coupling the second devices to one or more outputs of the plurality of input and output ports of the command center.

22. The network of claim 21 further comprising 1394 cables coupling 1394 controlled devices of the first set of devices to one or more outputs of the plurality of input and output ports of the command center.

23. A home theater network system (HTNS) comprising a control unit having a command input to receive user input commands specific to the control unit, a primary display unit coupled to the control unit, a plurality of audio and video (AV) input devices coupled to a plurality of input and output ports of the control unit, the plurality of AV devices comprising a mix of one or more analog devices and one or more digital devices, wherein the one or more digital devices communicate with the control unit over a bidirectional bus and wherein the one or more analog devices are incapable of communicating with the control unit over the bidirectional bus, and a control system adapted to operate on the control unit and translate user input control unit specific commands to device specific output messages to directly drive the one or more analog device via IR signals sent from the control unit to the one or more analog devices and the one or more digital devices via signals communicated from the command center over the bidirectional bus, wherein the control system comprises a graphical user interface (GUI) generated by a user interface (UI) module and displayable on a screen of the primary display unit, the GUI including a device selection menu comprising a plurality of icons corresponding to the plurality of AV devices, and wherein the control system is adapted to direct an audio and/or video signal from a first source device of the plurality of input AV devices to a sink device of the plurality of input AV devices via device specific output messages transmitted from the control system to the plurality of input AV devices while directing a signal from a second source device of the plurality of input AV devices to the primary display unit coupled to the control unit, wherein the first and second source devices and the sink device include one or more analog AV devices selected from the plurality of input AV devices coupled to the network.

24. The HTNS of claim 23 wherein the primary display and control unit comprises an AV system.

25. The HTNS of claim 24 wherein the AV system comprises a television.

26. The HTNS of claim 23 wherein the control unit comprises a computer.

27. The HTNS of claim 23 wherein the primary display unit comprises a television.

28. The HTNS of claim 23 wherein the user interface (UI) module is adapted to translate user input control unit specific commands.

29. The HTNS of claim 28 wherein the control system further comprises IR and 1394 control modules coupled to the UI module, the IR and 1394 control modules converting translated user input commands into device specific output messages to drive the one or more analog and one or more digital devices.

30. The HTNS of claim 29 wherein the control unit and primary display unit comprise a television and wherein the plurality of AV devices include internal television AV devices, the control system further comprises a television control module.

31. The HTNS of claim 29 further comprising a 1394 driver module coupled to the 1394 control module, the 1394 driver module adapted to communicate device appropriate output messages to 1394 devices of the one or more digital device.

32. The HTNS of claim 31 further comprising
an IR emitter controller coupled to the IR control module, and
an IR emitter coupled to the emitter controller.

33. The HTNS of claim 23 wherein the device selection menu comprises a device selection window, a video sink window, and an audio sink window.

34. The HTNS of claim 33 wherein the device selection menu further comprises a connection sink window.

35. The HTNS of claim 23 wherein the GUI further comprises a visual recognition system.

36. The HTNS of claim 35 wherein the visual recognition system comprises three states of visual recognition.

37. The HTNS of claim 36 wherein the three states of visual recognition comprise a disabled state, a current device state, and a selected icon state.

38. The HTNS of claim 35 wherein the visual recognition system comprises five states of visual recognition.

39. The HTNS of claim 38 wherein the five states of visual recognition system comprise a disable state, a selected icon/current device state, a selected icon/not current device state, a not selected icon/not current device state, and a not selected icon/current device state.

40. The HTNS of claim 29 wherein the UI module comprises
a first module determining a current system state and whether an input command comprises a menu related action or a direct device action,
a second module coupled to the first module, the second module determining whether a menu related action is a menu display action, a menu navigate action or a menu device action, and
a third module coupled to the first and second modules, the third module determining what device connections to make and instructing the IR and 1394 control modules as to what device actions to take.

41. The HTNS of claim 23 further comprising a user command input device operably coupled to the input of the control unit.

42. The HTNS of claim 41 wherein the input device is a remote control.

43. The HTNS of claim 42 wherein the remote control emits IR signals.

44. The HTNS of claim 42 wherein the remote control emits RF signals.

45. The HTNS of claim 23 wherein the input of the control unit is a USB port.

46. The HTNS of claim 23 wherein the input of the control unit comprises a voice recognition system.

47. The HTNS of claim 23 wherein the input of the control unit comprises an Internet connection.

48. The HTNS of claim 23 further comprising IR emitter cables separably coupling the of the one or more analog devices to one or more outputs of the plurality of input and output ports of the control unit.

49. The HTNS of claim 48 further comprising 1394 cables coupling 1394 devices of the one or more digital devices to the one or more outputs of the plurality of input and output ports of the control unit.

50. The HTNS of claim 25 wherein the plurality of AV devices includes internal television AV devices.

51. The HTNS of claim 31 wherein the plurality of AV devices includes internal television AV devices.

52. The HTNS of claim 23 further comprise non-AV 1394 devices coupled to the one or more outputs of the plurality of input and output ports of the control unit.

53. The HTNS of claim 51 wherein the non-AV 1394 devices include home appliances and systems.

54. A network system comprising
a command center having a command input adapted to receive user input command center specific commands,
a first plurality of input devices in direct communication with the command center to receive device specific output messages from the command center using a first communication protocol,
a second plurality of input devices in communication with the command center using a second communication protocol, wherein the first plurality of input devices are incompatible with the second communication protocol, and
a context sensitive control system associated with the command center and having a uniform user interface for control of the first and second pluralities of input devices, the control system being adapted to translate user input command center specific commands to device specific output messages to directly drive the first plurality of input devices using the first communication protocol and the second plurality of input devices using the second communication protocol,
wherein the user interface comprises a graphical user interface (GUI) generated by the control system and displayable on a screen of the command center and coupled to a translation module of the control system, the GUI including a device selection menu comprising a plurality of icons corresponding to the first and second plurality of input devices, and
wherein the control system is adapted to direct an audio and/or video signal from a first source device of the plurality of input AV devices to a sink device of the plurality of input AV devices via device specific output messages transmitted from the control system to the plurality of input AV devices while directing a signal from a second source device of the plurality of input AV devices to the screen of the command center, wherein the first and second source devices and the sink device include one or more analog AV devices selected from the plurality of input AV devices coupled to the network.

55. The network of claim 54 wherein the command center comprises an audio-video (AV) system.

56. The network of claim 55 wherein the AV system comprises a television.

57. The network of claim 54 wherein the command center comprises a control unit and a primary display unit coupled to the control unit.

58. The network of claim 57 wherein the control unit comprises a computer.

59. The network of claim 57 wherein the primary display unit comprises a television.

60. The network of claim 54 wherein the first and second plurality of input devices includes a mix of 1394 and IR controlled devices.

61. The network of claim 54 wherein the first and second plurality of input devices includes a mix of globally and locally controlled devices.

62. The network of claim 54 wherein the first and second plurality of input devices includes a mix of high and low speed devices.

63. The network of claim 54 wherein the first and second plurality of input devices includes a mix of AV and non-AV devices.

64. The network of claim 54 wherein the first and second plurality of input includes a mix of analog and digital devices.

65. The network of claim 54 wherein the translation module adapted to translate user input command center specific commands, and
first and second control modules coupled to the translation module, the first and second control modules adapted to convert translated user input commands into device specific output messages to drive the first and second plurality of input devices.

66. The network of claim 65 wherein the command center comprises a primary display screen.

67. The network of claim 54 wherein the device selection menu comprises a device selection window, a first sink device window, and a second sink device window.

68. The network of claim 67 wherein the device selection menu further comprises a connection sink window.

69. The network of claim 54 wherein the GUI further comprises a visual recognition system.

70. The network of claim 69 wherein the visual recognition system comprises a plurality of visual recognition states.

71. The network of claim 70 wherein the plurality of visual recognition states comprise a disabled state, a current device state, and a selected device state.

72. The network of claim 70 wherein the plurality of visual recognition states comprises five states of visual recognition.

73. The network of claim 72 wherein the five states of visual recognition system comprise a disable state, a selected/current device state, a selected/not current device state, a not selected/not current device state, and a not selected/current device state.

74. The network of claim 65 wherein the translation module comprises
a first module determining a current system state and whether an input command comprises a menu related action or a direct device action,
a second module coupled to the first module, the second module determining whether a menu related action is a menu display action, a menu navigate action or a menu device action, and
a third module coupled to the first and second modules, the third module determining what device connections to make and instructing the first and second control modules as to what device actions to take.

75. The network of claim 54 further comprising a user command input device operably coupled to the command center input.

76. The network of claim 75 wherein the input device is a remote control.

77. The network of claim 76 wherein the remote control emits IR signals.

78. A network system comprising
a control unit having a command input to receive user input control unit specific commands and plurality of input and output ports,
a primary display unit coupled to the control unit,
first and second pluralities of input devices coupled to the plurality of input and output ports of the control unit, wherein the first plurality of input devices communicate with the control unit over a first communication protocol and wherein the second plurality of input devices communicate with the control unit over a second communication protocol to receive device specific output messages from the control unit and are incompatible with the first communication protocol, and
a context sensitive control system operating on the control unit and having a uniform user interface to control the plurality of analog and digital input devices, the control system translating user input control unit specific commands to device specific output messages to directly drive the first plurality of input devices using the first communication protocol and the second plurality of input devices using the second communication protocol, wherein the user interface comprises a graphical user interface (GUI) generated by the control system and displayable on a screen of the primary display unit and coupled to a UI module, the GUI including a device selection menu comprising a plurality of icons corresponding to the first and second plurality of input devices, and
wherein the control system is adapted to direct an audio and/or video signal from a first source device of the plurality of input AV devices to a sink device of the plurality of input AV devices via device specific output messages transmitted from the control system to the plurality of input AV devices while directing a signal from a second source device of the plurality of input AV devices to the screen of the primary display unit coupled to the control unit, wherein the first and second source devices and the sink device include one or more analog AV devices selected from the plurality of input AV devices coupled to the network.

79. The network of claim 78 wherein the primary display unit and control unit comprises an AV system.

80. The network of claim 79 wherein the AV system comprises a television.

81. The network of claim 78 wherein the control unit comprises a computer.

82. The network of claim 78 wherein the primary display unit comprises a television.

83. The network of claim 78 wherein the user interface (UI) module adapted to translate user input commands.

84. The network of claim 83 wherein the control system further comprises device control modules coupled to the UI module and converting translated user input commands into device specific output messages to drive the first and second plurality of input devices.

85. The network of claim 84 wherein the control unit and primary display unit comprise a television and wherein the first and second plurality of input devices include internal television AV devices, the control system further comprises a television control module.

86. The network of claim 78 wherein the device selection menu comprises a device selection window, a first sink device window, and a second sink device window.

87. The network of claim 86 wherein the device selection menu further comprises a connection sink window.

88. The network of claim 78 wherein the GUI further comprises a visual recognition system.

89. The network of claim 88 wherein the visual recognition system comprises a plurality of visual recognition states.

90. The network of claim 89 wherein the plurality of visual recognition states comprise a disabled state, a current device state, and a selected icon state.

91. The network of claim 89 wherein the plurality of visual recognition states comprises five states of visual recognition.

92. The network of claim 91 wherein the five states of visual recognition system comprise a disable state, a selected icon/current device state, a selected icon/not current device state, a not selected icon/not current device state, and a not selected icon/current device state.

93. The network of claim 84 wherein the UI module comprises a first module determining a current system state and whether an input command comprises a menu related action or a direct device action,
 a second module coupled to the first module, the second module determining whether a menu related action is a menu display action, a menu navigate action or a menu device action, and
 a third module coupled to the first and second modules, the third module determining what device connections to make and instructing the device control modules as to what device actions to take.

94. The network of claim 78 wherein the first and second plurality of input devices includes a mix of 1394 and IR controlled devices.

95. The network of claim 78 wherein the first and second plurality of input devices includes a mix of globally and locally controlled devices.

96. The network of claim 78 wherein the first and second plurality of input devices includes a mix of high and low speed devices.

97. The network of claim 78 wherein the first and second plurality of input devices includes a mix of AV and non-AV devices.

98. The network of claim 78 further comprising a user command input device operably coupled to the input of the control unit.

99. The network of claim 98 wherein the input device is a remote control.

100. The network of claim 99 wherein the remote control emits IR signals.

101. The network of claim 99 wherein the remote control emits RF signals.

102. The network of claim 78 wherein the input of the control unit is a USB port.

103. The network of claim 78 wherein the input of the control unit comprises a voice recognition system.

104. The network of claim 78 wherein the input of the control unit comprises an internet connection.

* * * * *